United States Patent
Omoto et al.

(10) Patent No.: US 12,510,012 B1
(45) Date of Patent: Dec. 30, 2025

(54) ENGINE AND EXHAUST STRUCTURE

(71) Applicant: KAWASAKI MOTORS, LTD., Akashi (JP)

(72) Inventors: Keisuke Omoto, Akashi (JP); Matthew Colombo, Grand Rapids, MI (US); Jakob Daniel Cook, Grand Rapids, MI (US); Shuichi Yonaiyama, Akashi (JP); Kazuki Masui, Grand Rapids, MI (US)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/754,220

(22) Filed: Jun. 26, 2024

(51) Int. Cl.
*F01N 13/08* (2010.01)
*F02B 75/18* (2006.01)
*F02B 75/22* (2006.01)

(52) U.S. Cl.
CPC .............. *F01N 13/08* (2013.01); *F02B 75/22* (2013.01); *F02B 2075/1808* (2013.01)

(58) Field of Classification Search
CPC ........ F01N 13/008; F01N 13/10; F01N 13/14; F01N 3/28; F01N 13/08; F01N 2590/04; F02B 75/22
See application file for complete search history.

(56) References Cited

U.S. PATENT DOCUMENTS

| | | | | |
|---|---|---|---|---|
| 12,134,977 B2 * | 11/2024 | Yasoshina | ............. | F02B 75/228 |
| 12,134,979 B2 * | 11/2024 | Sugihara | ................. | F02B 75/22 |
| 2015/0135687 A1 * | 5/2015 | Sasaki | ...................... | F02B 75/22 60/299 |
| 2016/0123211 A1 * | 5/2016 | Takano | ................... | F01N 13/10 60/323 |
| 2024/0229700 A9 * | 7/2024 | Yasoshina | ............... | F01N 13/08 |

FOREIGN PATENT DOCUMENTS

WO   2022/180742 A1   9/2022

\* cited by examiner

*Primary Examiner* — Anthony Ayala Delgado
(74) *Attorney, Agent, or Firm* — XSENSUS LLP

(57) ABSTRACT

An engine includes: an engine body; an exhaust pipe through which an exhaust gas discharged from the engine body flows; and a downstream device including a downstream inlet to which the exhaust pipe is connected. The engine body includes a first cylinder, a second cylinder, a first exhaust port that communicates with the first cylinder, and a second exhaust port that communicates with the second cylinder. The exhaust pipe includes a first exhaust pipe connected to an outlet of the first exhaust port, and a second exhaust pipe connected to an outlet of the second exhaust port. The downstream inlet includes a first inlet to which a downstream end of the first exhaust pipe is connected, and a second inlet to which a downstream end of the second exhaust pipe is connected. A cross section of the downstream inlet has a point-symmetric shape around an axis extending along a connection direction of the downstream inlet and the exhaust pipe to allow the downstream device to connect to the exhaust pipe when the downstream device is in both a first posture and a second posture that is rotated 180 degrees from the first posture.

20 Claims, 16 Drawing Sheets

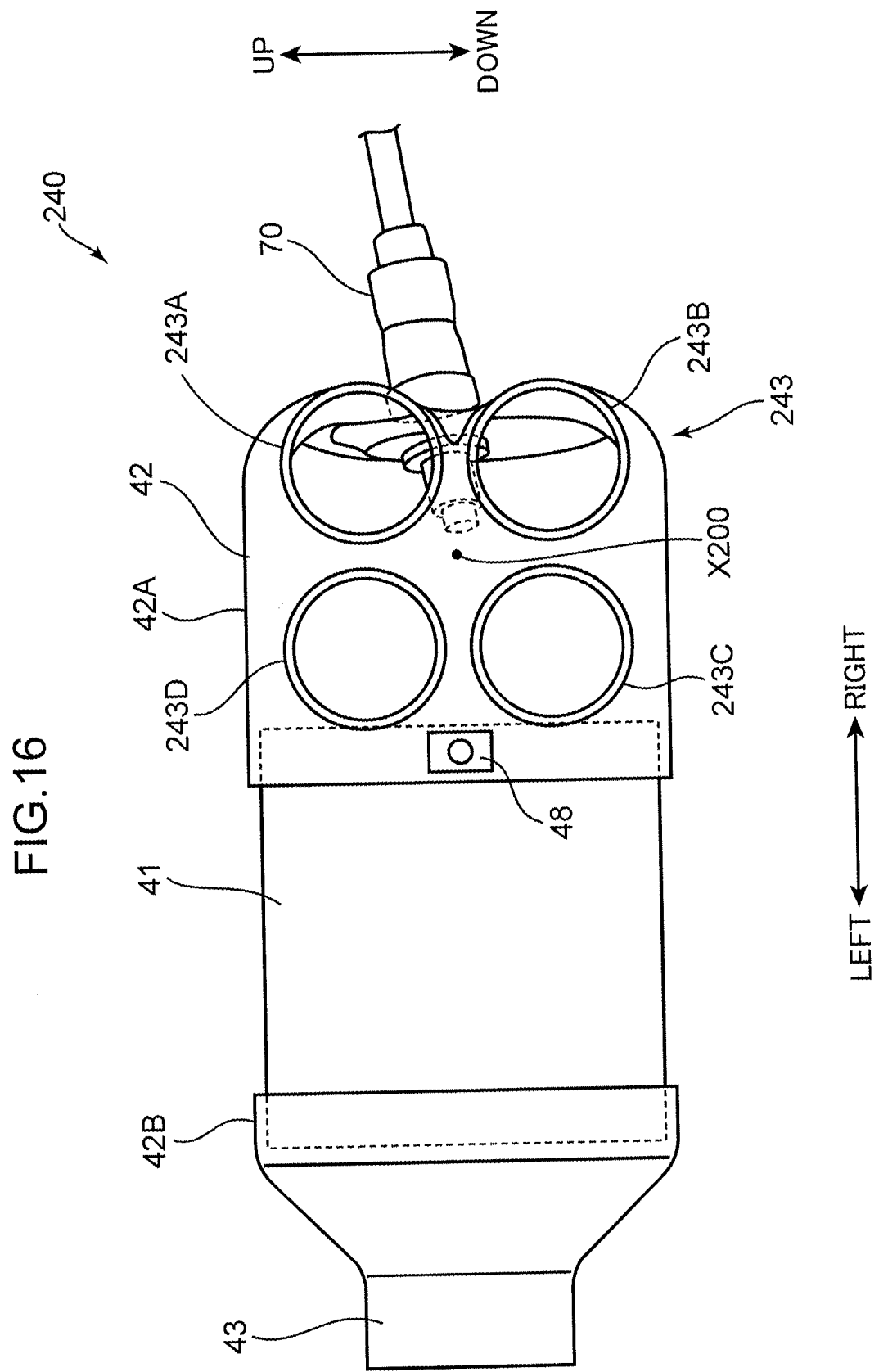

ENGINE AND EXHAUST STRUCTURE

FIELD OF INVENTION

The present disclosure relates to an engine and exhaust structure.

BACKGROUND ART

As one type of engine to be mounted on a work machine and the like, the engine described in WO2022/180742A1 is known. For such an engine, it is desirable to improve the degree of flexibility of mounting the engine on a work machine and the like.

SUMMARY OF THE INVENTION

The present disclosure has been made in consideration of the above-described circumstances, and an object thereof is to provide an engine having a high degree of mounting flexibility.

To solve the above problem, an engine according to one aspect of the present disclosure includes: an engine body; an exhaust pipe through which an exhaust gas discharged from the engine body flows; and a downstream device including a downstream inlet to which the exhaust pipe is connected, in which the engine body includes a first cylinder, a second cylinder, a first exhaust port that communicates with the first cylinder, and a second exhaust port that communicates with the second cylinder, the exhaust pipe includes a first exhaust pipe connected to an outlet of the first exhaust port, and a second exhaust pipe connected to an outlet of the second exhaust port, the downstream inlet includes a first inlet to which a downstream end of the first exhaust pipe is connected, and a second inlet to which a downstream end of the second exhaust pipe is connected, and a cross section of the downstream inlet has a point-symmetric shape around an axis extending along a connection direction of the downstream inlet and the exhaust pipe to allow the downstream device to connect to the exhaust pipe when the downstream device is in both a first posture and a second posture that is rotated 180 degrees from the first posture.

An engine according to another aspect of the present disclosure includes: an engine body in which a plurality of cylinders is formed; a plurality of exhaust pipes that is connected to the engine body and into which an exhaust gas discharged from each of the cylinders is introduced; and a downstream device including a downstream inlet to which each of the exhaust pipes is connected, in which the downstream inlet includes an equal or greater number of inlets than a number of the exhaust pipes, the inlets each being connectable to a downstream end of each of the exhaust pipes, and the downstream inlet, with the number of inlets being n, has an n-fold symmetric shape around an axis extending along a connection direction of the downstream inlet and the exhaust pipes.

BRIEF DESCRIPTION OF THE DRAWINGS

FIG. 16 is a view of a catalytic device according to the third embodiment of the present disclosure viewed from the rear.

DETAILED DESCRIPTION

Embodiments of an engine according to the present disclosure will be described below with reference to the drawings.

Overall Configuration of Engine

Figure 1:
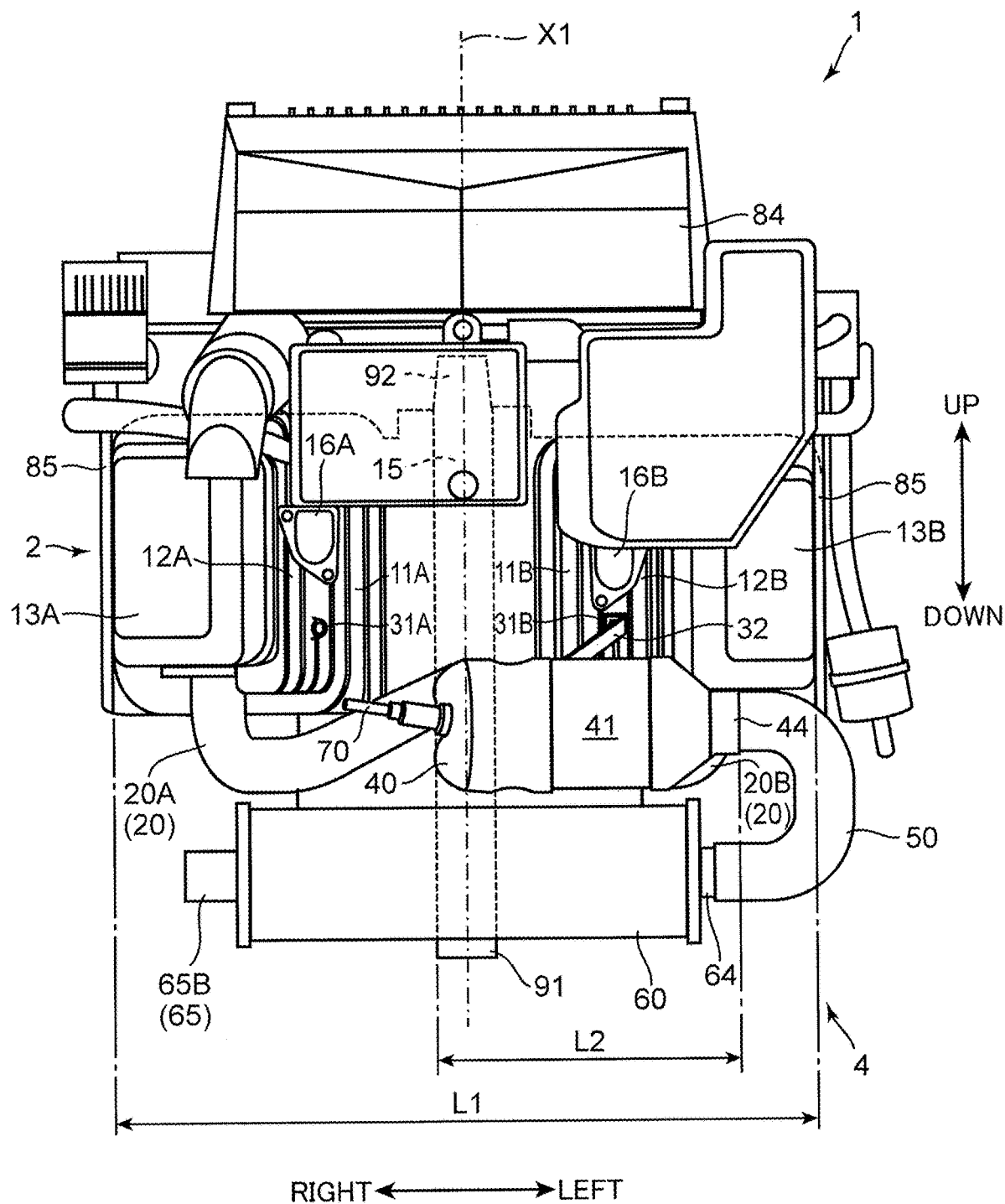
FIG. 1 is a schematic front view of an engine according to a first embodiment of the present disclosure, as viewed from the front.
Figure 2:
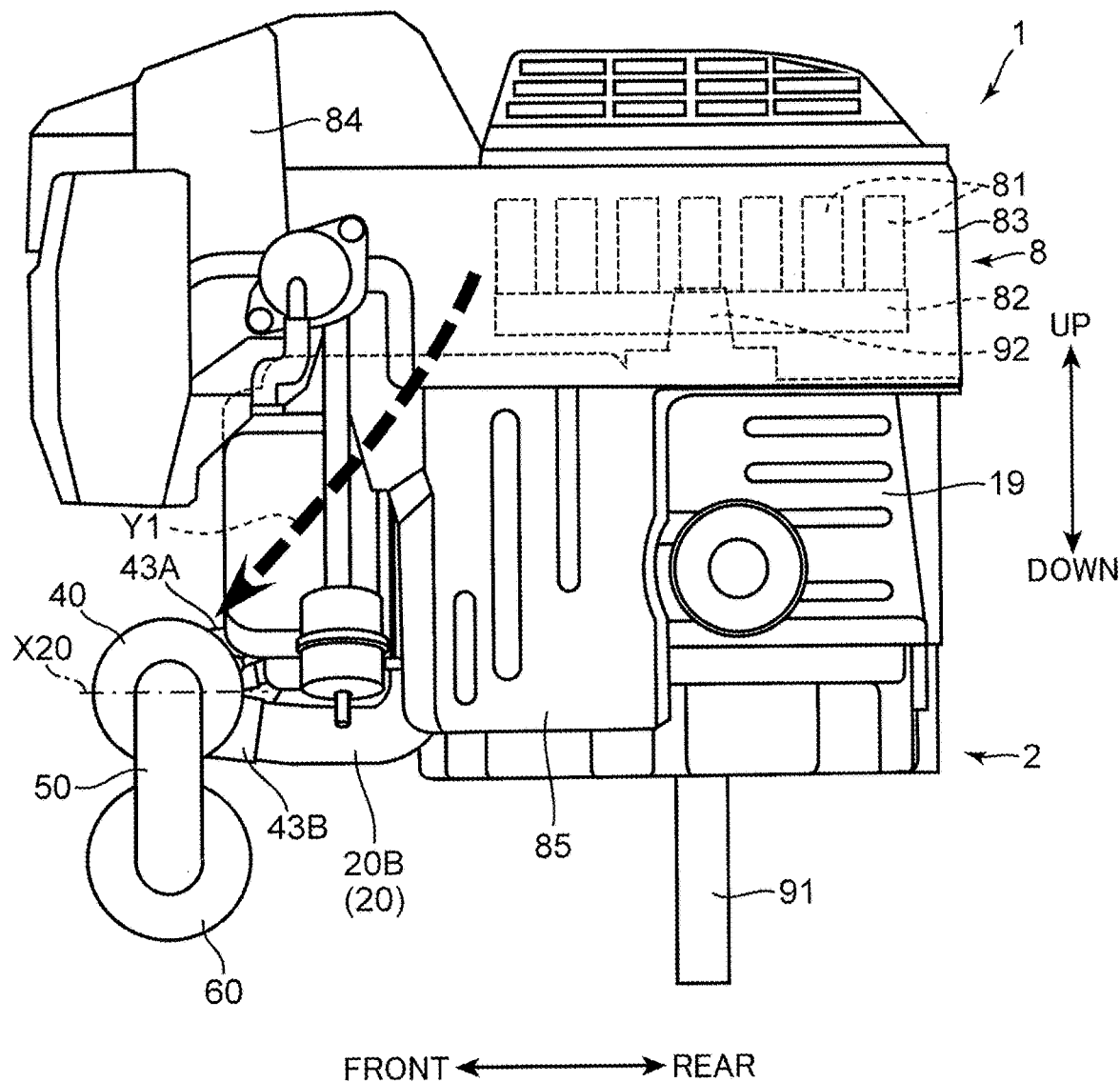
FIG. 2 is a schematic side view of the engine.
Figure 3:
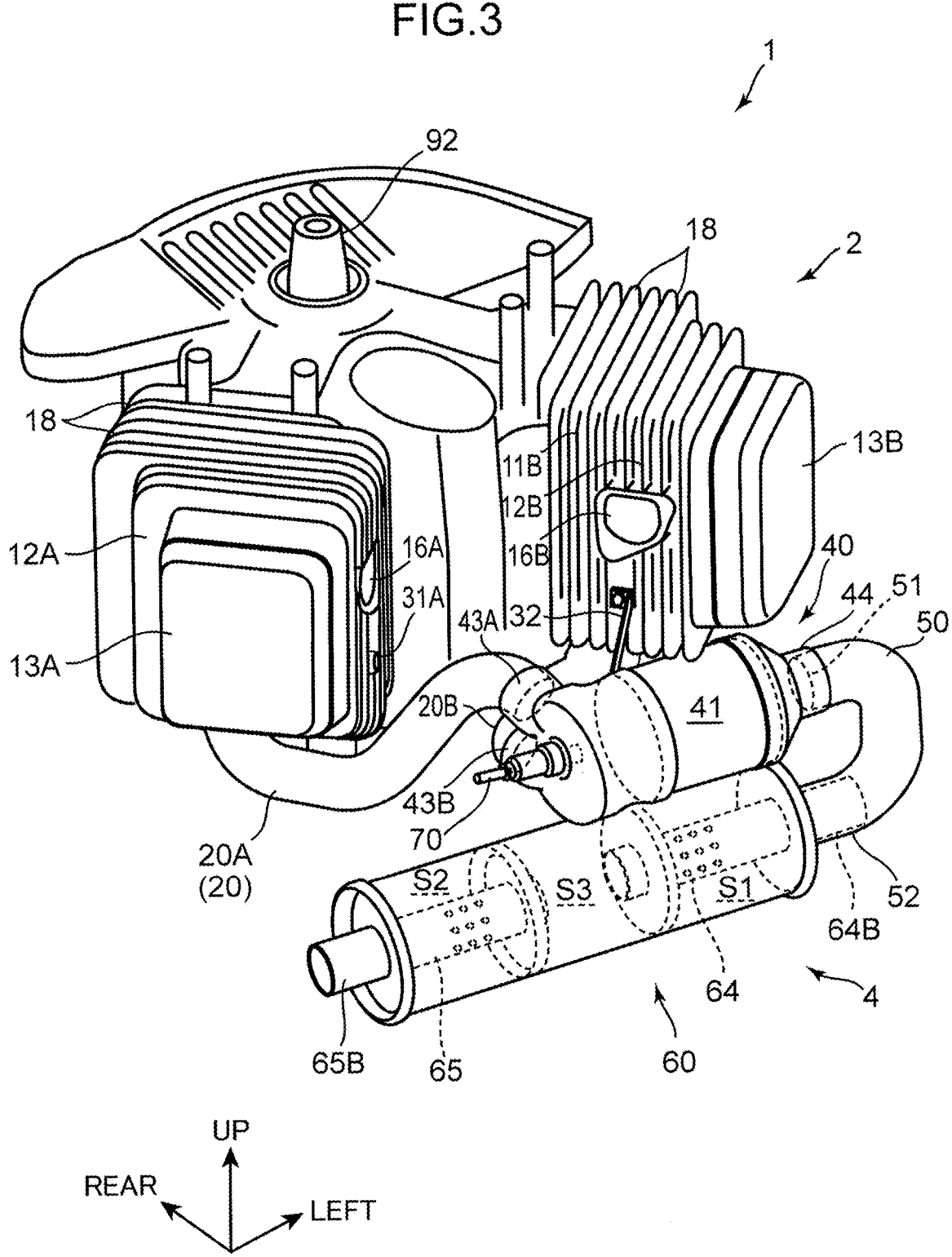
FIG. 3 is a schematic perspective view of an engine body and an exhaust system of the engine.
Figure 4:
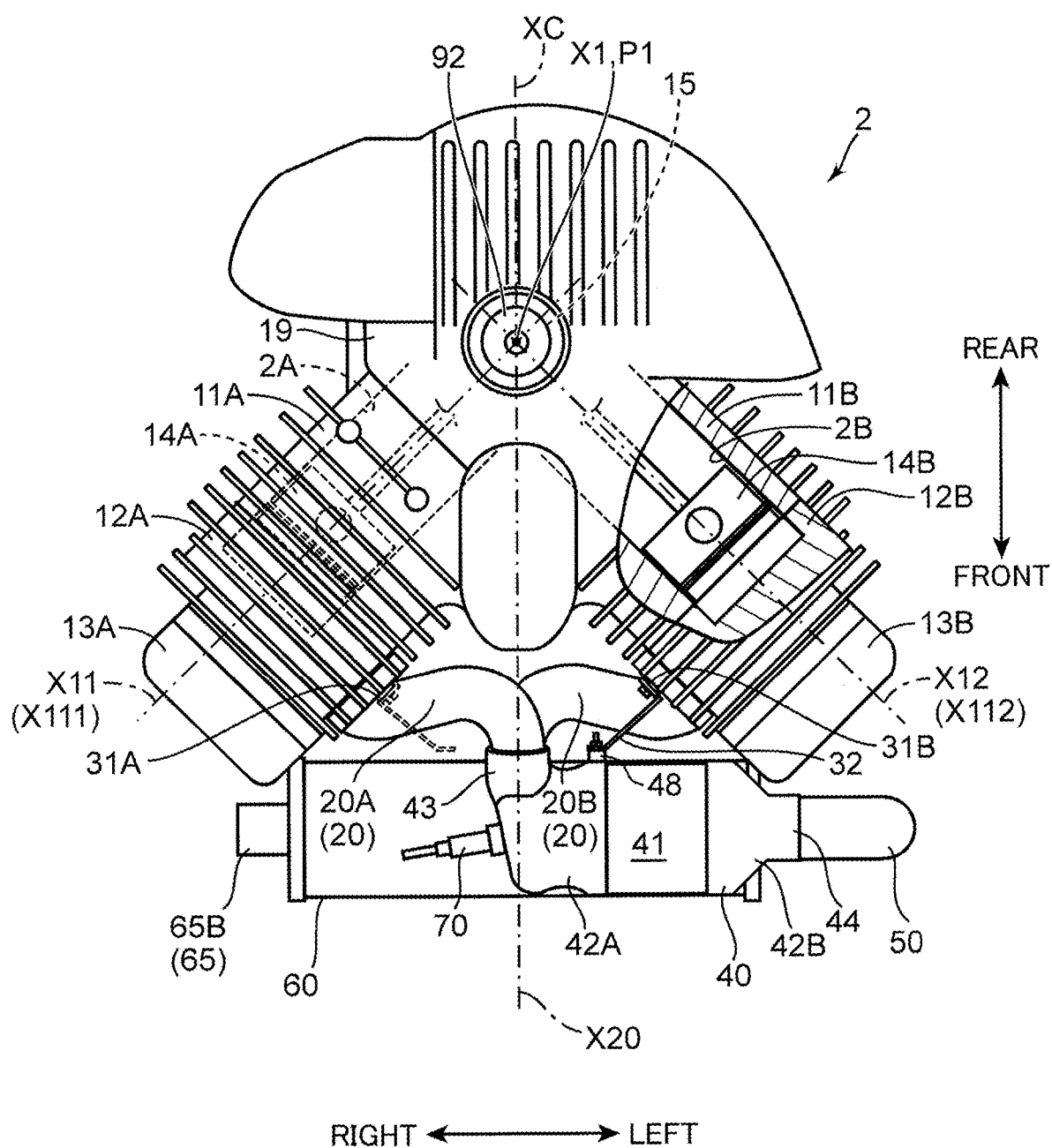
FIG. 4 is a schematic plan view of the engine body and the exhaust system.
Figure 5:
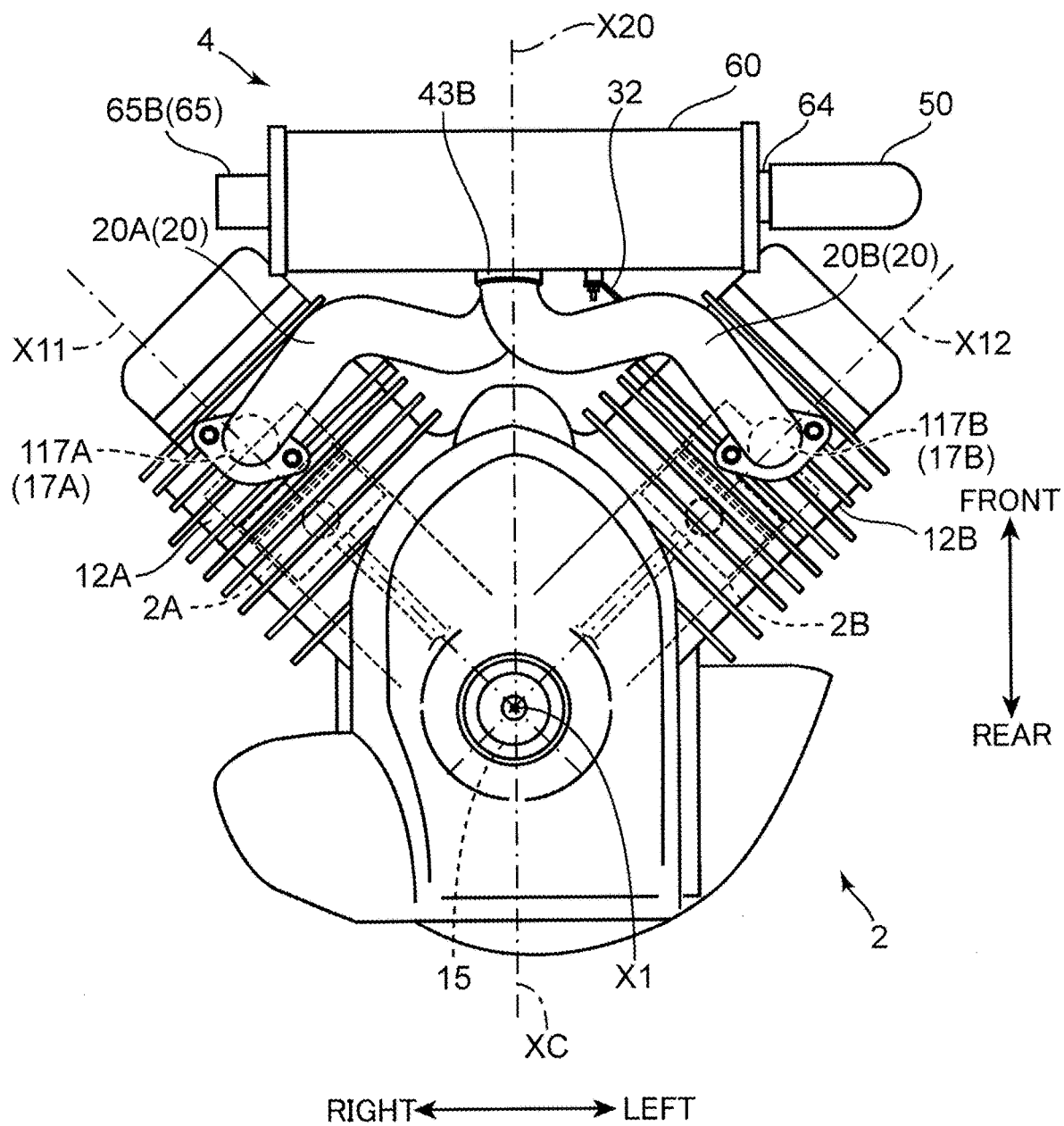
FIG. 5 is a schematic bottom view of the engine body and the exhaust system.

FIG. 1 is a schematic front view of an engine 1 according to a first embodiment of the present disclosure. FIG. 2 is a schematic side view of the engine 1. The engine 1 of the present disclosure includes an engine body 2, an exhaust system 4, and a fan 8. The engine 1 is mounted on a vehicle. For example, the engine 1 is mounted on a riding lawn mower and used as a propulsion source for the lawn mower and a driving source for cutting blades. Note that the lawn mower may be designed differently in the engine exhaust discharge direction depending on the discharge direction of the cut grass and the layout of other mounted objects. FIG. 3 is a schematic perspective view of the engine body 2 and the exhaust system 4. FIG. 4 is a schematic plan view of the engine body 2 and the exhaust system 4. FIG. 5 is a schematic bottom view of the engine body 2 and the exhaust system 4. Note that FIG. 4 shows a portion of the engine body 2 in a cutaway state. FIG. 3 shows by dashed lines the internal structure of a catalytic device 40 and a muffler 60, which will be described later, of the exhaust system 4.

The engine body 2 is a reciprocating engine. The engine body 2 is a so-called V-twin engine including two cylinders 2A and 2B.

The engine body 2 includes a pair of cylinder blocks 11A and 11B, a pair of cylinder heads 12A and 12B, and a pair of head covers 13A and 13B. The cylinder heads 12A and 12B are fastened to the cylinder blocks 11A and 11B, respectively. The head covers 13A and 13B are attached to the cylinder heads 12A and 12B, respectively.

One cylinder 2A and one cylinder 2B are formed in the two cylinder blocks 11A and 11B, respectively. The inner circumferential surface of each of the cylinders 2A and 2B has a cylindrical surface. The engine body 2 includes a first piston 14A. The first piston 14A reciprocates inside one cylinder 2A, which is the first cylinder 2A, along the axis thereof, which is a first cylinder axis X11. The engine body 2 includes a second piston 14B. The second piston 14B reciprocates inside the other cylinder 2B, which is the second cylinder 2B, along the axis thereof, which is a second cylinder axis X12. The engine body 2 includes a crankshaft 15. The crankshaft 15 is coupled to both of the two pistons 14A and 14B. The crankshaft 15 is driven to rotate by the two pistons 14A and 14B. The engine body 2 includes a crankcase 19. The crankcase 19 is coupled to the cylinder blocks 11A and 11B. The crankshaft 15 is accommodated inside the crankcase 19.

The crankshaft 15 extends in the up-and-down direction, that is, in the vertical direction. A crank axis X1, which is the rotation center line of the crankshaft 15, extends in the up-and-down direction. The first cylinder axis X11 and the second cylinder axis X12 extend horizontally. In this manner, the engine body 2 is used in a posture in which the crank axis X1 extends in the up-and-down direction and the cylinder axes X11 and X12 extend horizontally. In other words, the engine body 2 is designed on the assumption of being mounted on a work machine with the crank axis aligned in the up-and-down direction. Note that the engine 1 is provided with an oil pan that stores engine oil. The oil pan is placed on one side of the engine body 2 in the direction along the crank axis X1. In the present embodiment, the oil pan is placed below the engine body 2.

When viewed along the crank axis X1, that is, along the up-and-down direction, the first cylinder axis X11 and the second cylinder axis X12 intersect to form a V shape. Specifically, when viewed along the up-and-down direction, the first cylinder axis X11 and the second cylinder axis X12 intersect. The line segment of the first cylinder axis X11 that extends from an intersection P1 with the second cylinder axis X12 as a base point to the first cylinder 2A side is defined as a first reference line X111. The line segment of the second cylinder axis X12 that extends from the intersection P1 as a base point to the second cylinder 2B side is defined as a second reference line X112. The first reference line X111 and the second reference line X112 form an angle of less than 180 degrees, forming a V shape. When viewed along the up-and-down direction, the intersection P1 is located at a point on the crank axis X1.

In the present embodiment, when viewed along the up-and-down direction, a center line XC, which divides the entire engine body 2 in half, bisects the angle between the first reference line X111 and the second reference line X112. In the following, the direction along the center line XC is referred to as front-and-rear direction. The cylinders 2A and 2B and the crankshaft 15 are spaced apart from each other in the front-and-rear direction. In the following, the side of the crankshaft 15 with respect to the cylinders 2A and 2B is referred to as rear side, and the opposite side is referred to as front side. The direction orthogonal to the up-and-down direction and the front-and-rear direction is referred to as right-and-left direction. Note that each direction shown in each figure represents the direction defined above. In each figure, out of the two cylinders 2A and 2B, the cylinder located on the right side is shown as the first cylinder 2A, and the cylinder located on the left side is shown as the second cylinder 2B. In the following description as well, the cylinder located on the right side will be treated as the first cylinder 2A, and the cylinder located on the left side will be treated as the second cylinder 2B.

In the cylinder heads 12A and 12B, intake ports 16A and 16B for introducing intake air into the cylinders 2A and 2B are formed, respectively. The first intake port 16A corresponding to the first cylinder 2A opens on the left side surface of the first cylinder head 12A. The second intake port 16B corresponding to the second cylinder 2B opens on the right side surface of the second cylinder head 12B. Note that the intake ports 16A and 16B are connected to an intake system device such as an intake pipe, but illustration of the intake system device is omitted.

In the cylinder heads 12A and 12B, exhaust ports 17A and 17B for deriving exhaust gas generated in the cylinders 2A and 2B from the cylinders 2A and 2B are formed, respectively. The downstream end of the first exhaust port 17A corresponding to the first cylinder 2A, that is, an outlet 117A of the first exhaust port 17A opens on the lower surface of the first cylinder head 12A. The downstream end of the second exhaust port 17B corresponding to the second cylinder 2B, that is, an outlet 117B of the second exhaust port 17B opens on the lower surface of the second cylinder head 12B. The first exhaust port 17A and the second exhaust port 17B are arranged in the right-and-left direction. When viewed along the up-and-down direction, the first exhaust port 17A and the second exhaust port 17B are formed at bilaterally symmetrical positions with the center line XC as the center. In this way, in the present first embodiment, the port arrangement direction, which is the arrangement direction of the first exhaust port 17A and the second exhaust port 17B, agrees with the right-and-left direction. In other words, in the description of the engine 1 according to the present first embodiment, the port arrangement direction is referred to as the right-and-left direction.

The engine 1 includes a first output shaft 91 and a second output shaft 92 that are each rotatable together with the crankshaft 15. The first output shaft 71 protrudes downward from the lower surface of the crankcase 19. The first output shaft 71 is coupled to wheels, cutting blade, or the like and rotates the wheels, the cutting blade, or the like. The second output shaft 72 protrudes upward from the upper surface of the crankcase 19.

The exhaust system 4 is a system that discharges the exhaust gas generated in the cylinders 2A and 2B to the atmosphere. The exhaust system 4 is coupled to the engine body 2. The exhaust system 4 incudes an exhaust pipe 20, the catalytic device 40, a connection pipe 50, and the muffler 60. These components 20, 40, 50, and 60 define the exhaust passage through which the exhaust gas flows. The exhaust pipe 20, the catalytic device 40, the connection pipe 50, and the muffler 60 are provided in this order from the upstream side in the flow direction of the exhaust gas. The catalytic device 40 incorporates a catalyst 41B. The catalytic device 40 purifies the exhaust gas through an oxidation-reduction reaction of the catalyst 41B. The catalyst 41B is, for example, a three-way catalyst. The muffler 60 is a silencing device for reducing exhaust noise. The catalytic device 40 corresponds to "downstream device" in the present disclosure. The muffler 60 corresponds to "second downstream device" in the present disclosure.

The engine 1 includes coupling members 32 that couple the catalytic device 40 to the engine body 2. The engine body 2 includes a first support part 31A and a second support part 31B that support the coupling members 32. The coupling members 32 each have a plate shape extending in a predetermined direction. One end of the coupling member 32 in the longitudinal direction is fixed to one of the first support part 31A and the second support part 31B, and the other end is fixed to the catalytic device 40. As a result, the catalytic device 40 is coupled to the engine body 2 via the coupling members 32. The first support part 31A is provided on the first cylinder head 12A. The first support part 31A is provided on the left surface of the first cylinder head 12A. A bolt hole is formed in the first support part 31A. The first support part 31A and one end of the coupling member 32 are fastened by a bolt attached to the bolt hole. The second support part 31B is provided on the second cylinder head 12B. The second support part 31B is provided on the right surface of the second cylinder head 12B. A bolt hole is formed in the second support part 31B. The second support part 31B and one end of the coupling member 32 are fastened by a bolt attached to the bolt hole.

The engine body 2 is an air-cooled engine. A plurality of cooling fins 18 is provided on the outer surfaces of the cylinder blocks 11A and 11B and the cylinder heads 12A and 12B.

The fan 8 blows a wind to the engine body 2 to cool the engine body 2. The fan 8 is placed above the crankcase 19. The crankcase 19 constitutes the rear portion of the engine body 2. The fan 8 is placed above the rear portion of the engine body 2.

The fan 8 includes a fan body 82 including a plurality of blades 81 and a fan case 83 that surrounds the outer periphery of the fan body 82. The fan body 82 is coupled to the second output shaft 92. The fan body 82 is driven to rotate by the second output shaft 92. The fan 8 is a centrifugal fan. When the fan body 82 rotates, air is drawn in from above the fan body 82 and discharged to the outer peripheral side of the fan body 82.

The fan case 83 extends forward of the fan body 82. The front of the fan case 83 is mostly covered by a device 84 of the intake system and the like. The engine 1 is provided with covers 85 and 85. The covers 85 and 85 each extend downward from near both left and right edges of the front portion of the fan case 83. The covers 85 and 85 are placed to cover both left and right sides of the engine body 2. With this configuration, the air discharged to the outer peripheral side of the fan body 82 is mainly guided diagonally forward and downward from the front of the fan body 82, as shown by the arrow Y1 in FIG. 2. As shown in FIG. 2, the front portion of the engine body 2 including the cylinder blocks 11A and 11B and the cylinder heads 12A and 12B is placed at the position diagonally forward and downward of the fan body 82. As a result, the cylinder blocks 11A and 11B and the cylinder heads 12A and 12B are cooled by the air discharged by the fan 8.

Exhaust System

Figure 6:
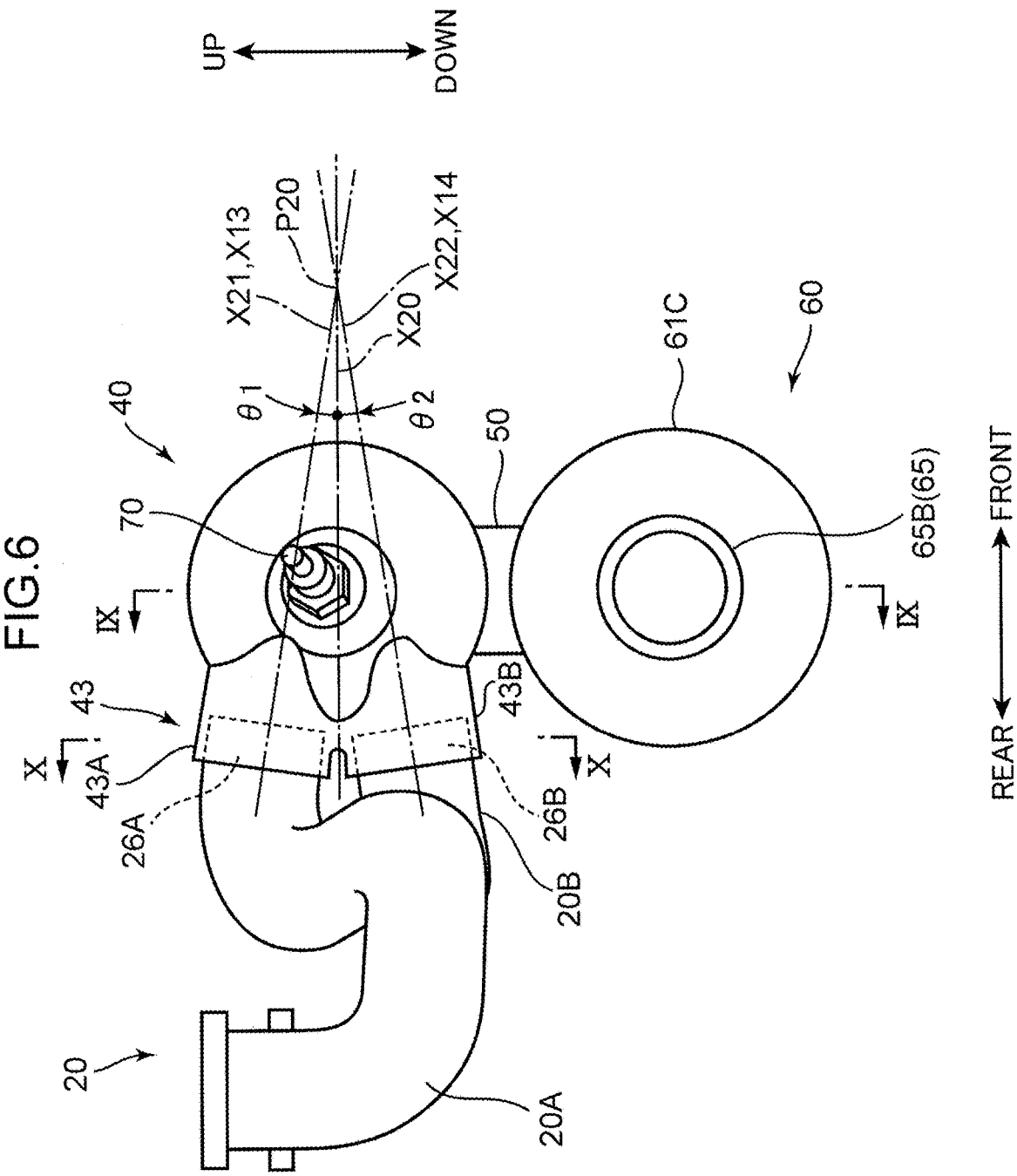
FIG. 6 is a schematic side view of the exhaust system.
Figure 7:
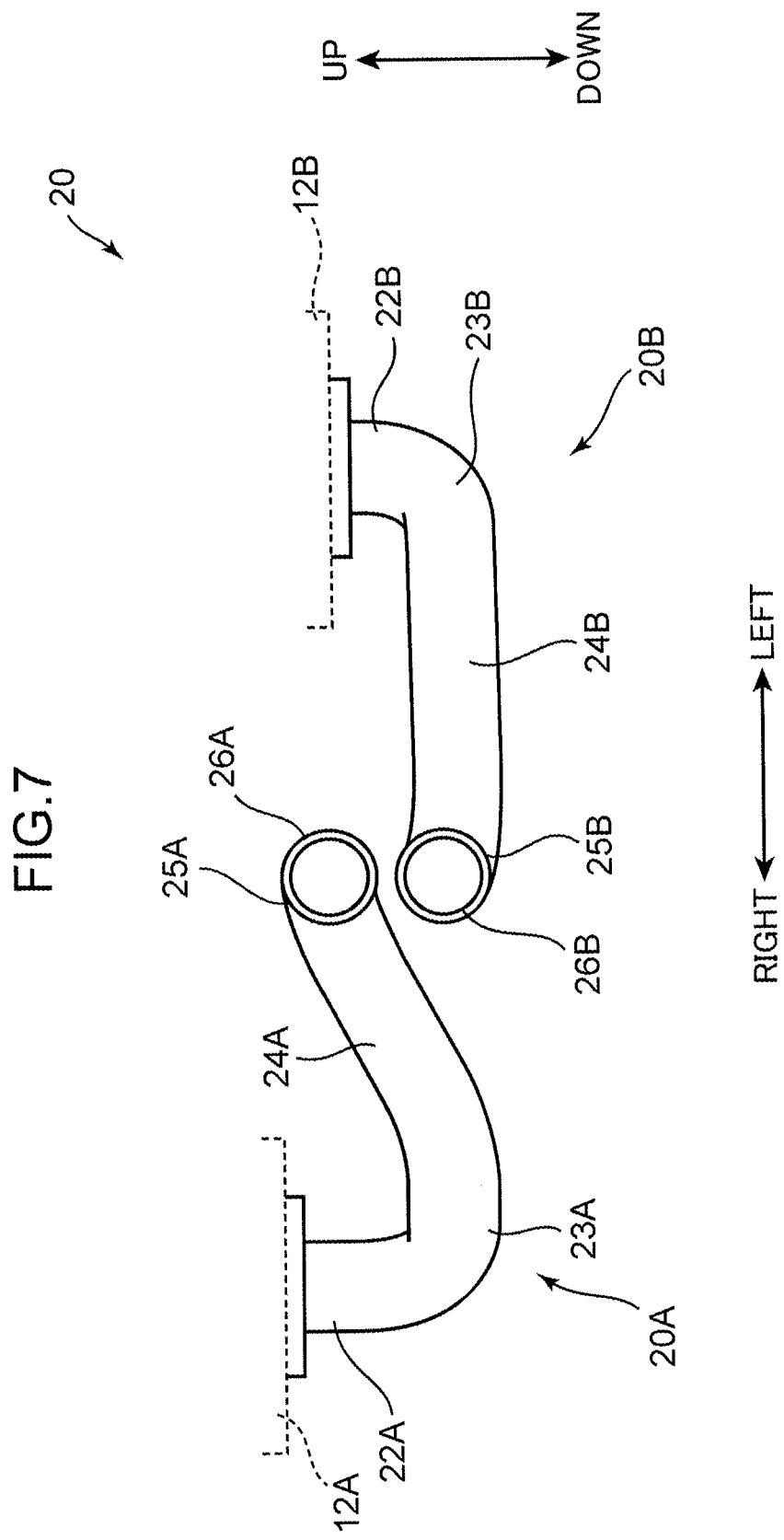
FIG. 7 is a view of an exhaust pipe of the exhaust system viewed from the front.
Figure 8:
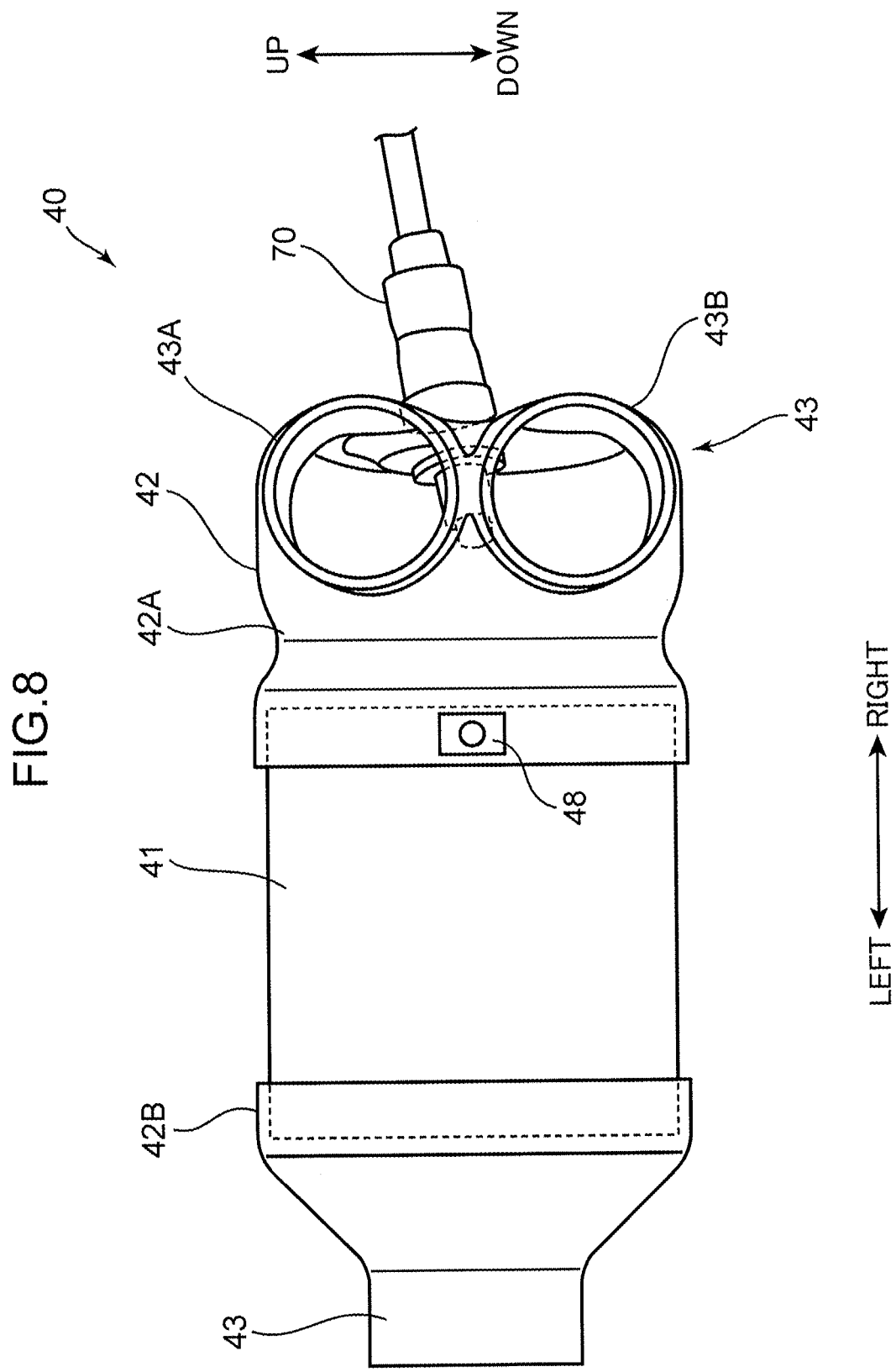
FIG. 8 is a view of a catalytic device of the exhaust system viewed from the rear.
Figure 9:
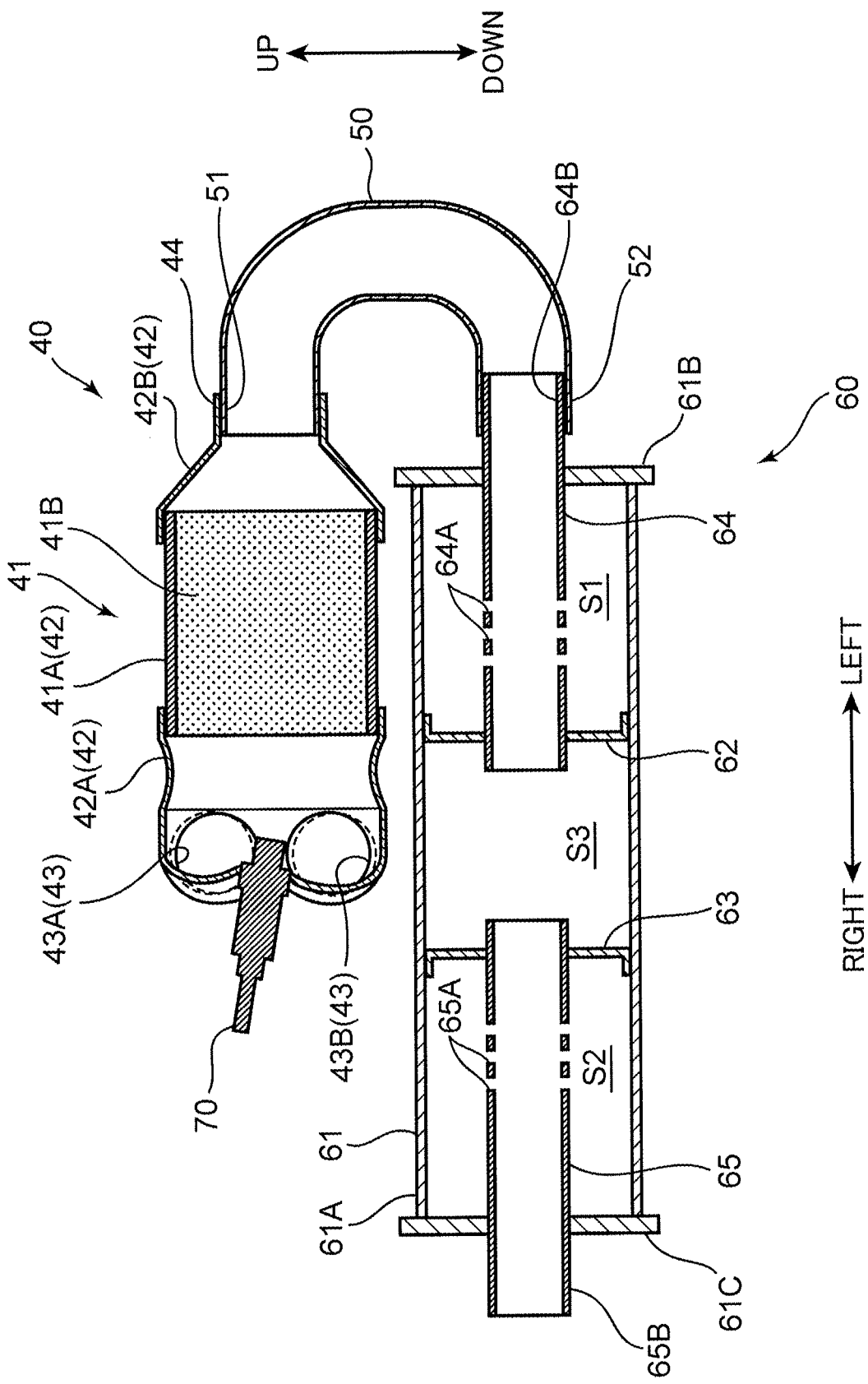
FIG. 9 is a cross-sectional view taken along the line IX-IX of FIG. 6.
Figure 10:
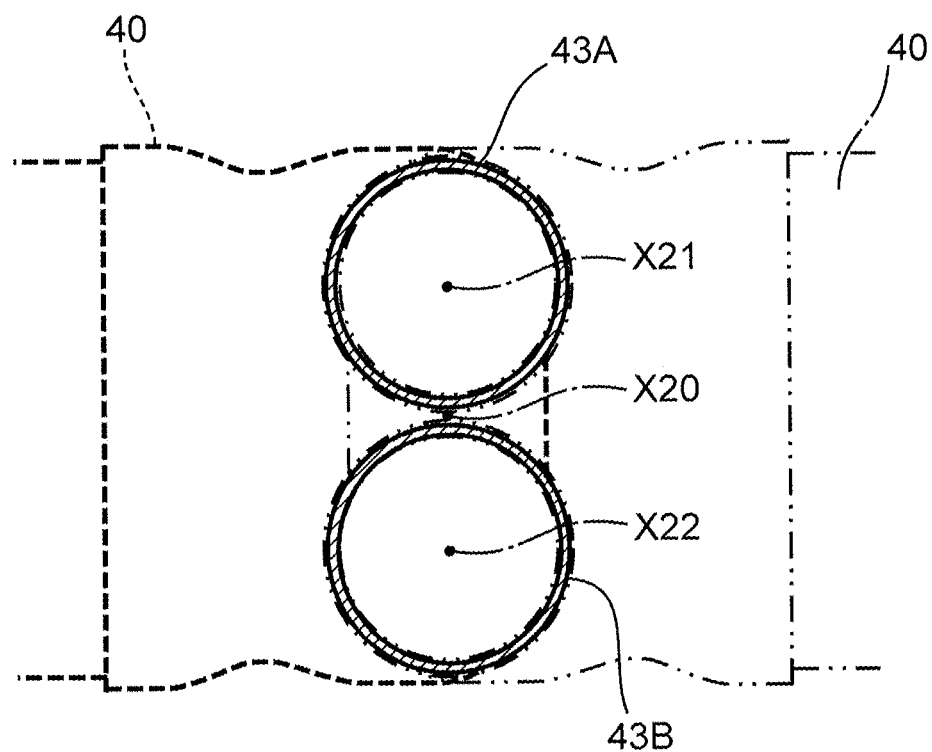
FIG. 10 is an enlarged view of a portion of a cross section of the catalytic device taken along the line X-X of FIG. 6.

The detailed configuration of the exhaust system 4, the exhaust structure according to the first embodiment will be described below. FIG. 6 is a schematic side view of the exhaust system 4. FIG. 7 is a view of the exhaust pipe 20 of the exhaust system 4 viewed from the front. In more detail, FIG. 7 is a view of the exhaust pipe 20 alone, the exhaust pipe 20 with the catalytic device 40 removed, as viewed from the front. FIG. 8 is a view of the catalytic device 40, viewed from the rear. In more detail, FIG. 8 is a view of the catalytic device 40 alone, the catalytic device 40 with the exhaust pipe 20 and the connection pipe 50 (described later) removed, viewed from the rear. FIG. 9 is a cross-sectional view taken along the line IX-IX of FIG. 6. FIG. 10 is an enlarged view of a portion of the cross section of the catalytic device 40 taken along the line X-X of FIG. 6. In the following, the upstream side and the downstream side in the flow direction of the exhaust gas is simply referred to as upstream side and downstream side as appropriate.

The exhaust pipe 20 is connected to the engine body 2. The exhaust gas discharged from the engine body 2 flows inside the exhaust pipe 20. The exhaust pipe 20 includes a first exhaust pipe 20A and a second exhaust pipe 20B that are each connected to the engine body 2.

The first exhaust pipe 20A is connected to the outlet 117A of the first exhaust port 17A. The exhaust gas is introduced from the first cylinder 2A to the first exhaust pipe 20A via the first exhaust port 17A. The first exhaust pipe 20A is fixed to the lower surface of the first cylinder head 12A. The upstream end of the first exhaust pipe 20A communicates with the outlet 117A of the first exhaust port 17A.

The first exhaust pipe 20A extends downward from the lower surface of the first cylinder head 12A, then extends diagonally forward and leftward, then extends diagonally upward and leftward, and further extends forward. Specifically, the first exhaust pipe 20A includes a first most upstream section 22A, a first upstream section 23A, a first intermediate section 24A, and a first downstream section 25A. The first most upstream section 22A extends downward from the lower surface of the first cylinder head 12A. The first upstream section 23A extends diagonally forward and leftward from the lower end of the first most upstream section 22A. The first intermediate section 24A extends diagonally upward and leftward from the front end of the first upstream section 23A. The first downstream section 25A extends forward from the left end of the first intermediate section 24A. The coupling part of each section is curved, and each section is smoothly connected.

A first derivation part 26A, the downstream end of the first exhaust pipe 20A, is constituted by the front end of the first downstream section 25A. The first derivation part 26A has a tubular shape extending in the front-and-rear direction and is open forward. The first downstream section 25A and the first derivation part 26A are inclined to be positioned downward toward the front side.

The second exhaust pipe 20B is connected to the outlet 117B of the second exhaust port 17B. The exhaust gas is introduced from the second cylinder 2B to the second exhaust pipe 20B via the second exhaust port 17B. The second exhaust pipe 20B is fixed to the lower surface of the second cylinder head 12B. The upstream end of the second exhaust pipe 20B communicates with the outlet 117B of the second exhaust port 17B.

The second exhaust pipe 20B extends downward from the lower surface of the second cylinder head 12B, then extends diagonally forward and rightward, then extends rightward, and further extends forward. Specifically, the second exhaust pipe 20B includes a second most upstream section 22B, a second upstream section 23B, a second intermediate section 24B, and a second downstream section 25B. The second most upstream section 22B extends downward from the lower surface of the second cylinder head 12B. The second upstream section 23B extends diagonally forward and rightward from the lower end of the second most upstream section 22B. The second intermediate section 24B extends rightward from the front end of the second upstream section 23B. The second downstream section 25B extends forward from the right end of the second intermediate section 24B. The coupling part of each section is curved, and each section is smoothly connected.

A second derivation part 26B, the downstream end of the second exhaust pipe 20B, is constituted by the front end of the second downstream section 25B. The second derivation part 26B has a tubular shape extending in the front-and-rear direction and is open forward. The second downstream section 25B and the second derivation part 26B are inclined to be positioned upward toward the front side.

The first exhaust pipe 20A and the second exhaust pipe 20B are configured by round pipes. The first derivation part 26A has a cylindrical shape extending in the front-and-rear direction. A central axis X13 of the first derivation part 26A extends in the front-and-rear direction. The central axis X13 of the first derivation part 26A is inclined to be positioned downward toward the front side. The second derivation part 26B has a cylindrical shape extending in the front-and-rear direction. A central axis X14 of the second derivation part 26B extends in the front-and-rear direction. The central axis X14 of the second derivation part 26B is inclined to be positioned upward toward the front side.

The first derivation part 26A and the second derivation part 26B are arranged in the up-and-down direction. The second derivation part 26B is located below the first derivation part 26A. Both the first derivation part 26A and the second derivation part 26B are located between the outlet 117A of the first exhaust port 17A and the outlet 117B of the second exhaust port 17B in the right-and-left direction. When viewed along the up-and-down direction, the first derivation part 26A and the second derivation part 26B are both located on the center line XC. In more detail, when viewed along the up-and-down direction, the central axis X13 of the first derivation part 26A and the central axis X14 of the second derivation part 26B both agree with the center line XC. That is, the first derivation part 26A and the second derivation part 26B are both placed at positions with the equal distance from the first reference line X111, the first cylinder axis X11, the second reference line X112, and the second cylinder axis X12.

The catalytic device 40 is connected to the exhaust pipe 20. The catalytic device 40 has a shape extending in the right-and-left direction. The size L2 of the catalytic device 40 in the right-and-left direction, that is, the size L2 in the longitudinal direction is set to a size smaller than half of the size L1 of the engine body 2 in the right-and-left direction.

The catalytic device 40 is placed in the path of the wind blown from the fan 8. Specifically, the catalytic device 40 is placed at a position forward of the lower portion of the engine body 2, and at a diagonally forward and downward position of the front of the fan body 82. As a result, the catalytic device 40 receives the wind blown from the fan 8 and is cooled by the wind.

The catalytic device 40 includes a body 42, a downstream inlet 43, and a downstream outlet 44. The body 42 is a part that forms the main outer shape of the catalytic device 40 and has a tubular shape extending in the right-and-left direction. The downstream inlet 43 is a part that introduces the exhaust gas into the body 42. The downstream outlet 44 is a part that derives the exhaust gas from inside the body 42. The downstream inlet 43 is provided at one end of the catalytic device 40 in the longitudinal direction, that is, in the right-and-left direction. The downstream outlet 44 is provided at the other end of the catalytic device 40 in the longitudinal direction, that is, in the right-and-left direction.

Here, the orientation of the catalytic device 40 in the right-and-left direction can be changed as described later. The following describes the structure of the catalytic device 40 by using the direction in which the catalytic device 40 is in a first posture shown in FIGS. 1 to 5. In the state where the catalytic device 40 is in the first posture, the downstream inlet 43 is located at the right end of the catalytic device 40 and the downstream outlet 44 is located at the left end of the catalytic device 40.

The catalytic device 40 includes a cylindrical catalyst body 41 extending in the right-and-left direction. The catalyst body 41 includes a cylindrical catalyst case 41A extending in the right-and-left direction, and the catalyst 41B supported by a carrier provided inside the catalyst case 41A.

The catalyst body 41 is provided at the center of the catalytic device 40 in the right-and-left direction. The catalyst case 41A of the catalyst body 41 constitutes the central part of the body 42 in the right-and-left direction.

The body 42 includes the catalyst case 41A, an upstream body 42A, and a downstream body 42B. The upstream body 42A constitutes a part of the body 42 that is on the right side and upstream side of the catalyst body 41. The downstream body 42B constitutes a part of the body 42 that is on the left side and downstream side of the catalyst body 41. The upstream body 42A is joined to the right end of the catalyst case 41A in a posture extending to the right from there. A space that communicates with the right open end of the catalyst case 41A is partitioned inside the upstream body 42A. The downstream body 42B is joined to the left end of the catalyst case 41A in a posture extending to the left from there. A space that communicates with the left open end of the catalyst case 41A is partitioned inside the downstream body 42B.

The downstream inlet 43 is provided in the rear side surface of the upstream body 42A. The downstream inlet 43 includes a first inlet 43A and a second inlet 43B. The first inlet 43A protrudes rearward from the upper portion of the rear side surface of the upstream body 42A. The second inlet 43B protrudes rearward from the lower portion of the rear side surface of the upstream body 42A. The first inlet 43A and the second inlet 43B both have a tubular shape extending in the front-and-rear direction. The front open ends of the first inlet 43A and the second inlet 43B communicate with the inner space of the upstream body 42A.

A cross section orthogonal to the front-and-rear direction of the downstream inlet 43 has a point-symmetric shape around an axis X20 extending in the front-and-rear direction. That is, the cross section orthogonal to the front-and-rear direction of the downstream inlet 43 has a shape that agrees before and after the catalytic device 40 is rotated 180 degrees about the axis X20.

Specifically, the first inlet 43A and the second inlet 43B each have a cylindrical shape extending in the front-and-rear direction. The first inlet 43A is inclined diagonally rearward and upward to be located upward toward the rear side. A central axis X21 of the first inlet 43A is inclined diagonally rearward and upward. The second inlet 43B is inclined diagonally rearward and downward to be located downward toward the rear side. A central axis X22 of the second inlet 43B is inclined diagonally rearward and upward.

The central axis X21 of the first inlet 43A and the central axis X22 of the second inlet 43B form the same straight line when viewed from above. The inner and outer diameters of the first inlet 43A and the second inlet 43B are set to the same size as each other. The angle θ1 formed by the central axis X21 of the first inlet 43A with respect to the axis X20 extending in the front-and-rear direction through an intersection P20 of the central axis X21 of the first inlet 43A and the central axis X22 of the second inlet 43B, and the angle θ2 formed by the central axis X22 of the second inlet 43B are set to the same angle with respect to the axis X20. Note that when viewed along the up-and-down direction, the central axis X21 of the first inlet 43A and the central axis X22 of the second inlet 43B, and the above-described axis X20 are the same straight line. In the following, the above-described axis X20 is referred to as rotation center line X20 as appropriate.

As shown in FIG. 10, the cross section orthogonal to the front-and-rear direction of the first inlet 43A has a shape that follows an ellipse with the major axis extending in the up-and-down direction and the minor axis extending in the right-and-left direction. Similarly, the cross section orthogonal to the front-and-rear direction of the second inlet 43B has a shape that follows an ellipse with the major axis extending in the up-and-down direction and the minor axis extending in the right-and-left direction. The sizes of the major axes of the cross sections of the first inlet 43A and the second inlet 43B are the same as each other, and the sizes of the minor axes are the same as each other. Note that the difference in size between the major axis and the minor axis of each cross section is very small, and each cross section has a shape close to a ring.

With the above configuration, when the catalytic device 40 is rotated 180 degrees around the rotation center line X20 from the state shown by the solid and dashed lines in FIG. 10 to the state shown by the chain line, regarding the cross section orthogonal to the rotation center line X20, that is, the cross section orthogonal to the front-and-rear direction, the cross-sectional shape of the first inlet 43A after the rotation agrees with the cross-sectional shape of the second inlet 43B before the rotation. The cross-sectional shape of the second inlet 43B after the rotation agrees with the cross-sectional shape of the first inlet 43A before the rotation. In this way, the downstream inlet 43 constituted by the first inlet 43A and the second inlet 43B is configured such that the cross section orthogonal to the front-and-rear direction thereof has a shape that is point-symmetric about the rotation center line X20. All cross sections of the downstream inlet 43 orthogonal to the front-and-rear direction are configured as described above, and the downstream inlet 43 has a two-fold symmetric shape. Here, an n-fold symmetric shape is a shape that agrees before and after rotation by m (m=360÷n) degrees around a predetermined axis when n is an integer of 2 or more. That is, the downstream inlet 43 has a shape that agrees when rotated by 180(=360÷2) degrees around the rotation center line X20.

In the first posture shown in FIGS. 1 to 5, the first inlet 43A is connected to the first derivation part 26A. Specifically, the first derivation part 26A is connected to the first inlet 43A by being inserted into the first inlet 43A. The first derivation part 26A and the first inlet 43A are connected coaxially. That is, in the connection state, the central axis X13 of the first derivation part 26A and the central axis X21 of the first inlet 43A constitute the same straight line. In the present first embodiment, the first inlet 43A and the first derivation part 26A are joined by welding or the like while being connected to each other. In the first posture, the second inlet 43B is connected to the second derivation part 26B. Specifically, the second derivation part 26B is connected to the second inlet 43B by being inserted into the second inlet 43B. The second derivation part 26B and the second inlet 43B are connected coaxially. That is, in the connection state, the central axis X14 of the second derivation part 26B and the central axis X22 of the second inlet 43B constitute the same straight line. In the present first embodiment, the second inlet 43B and the second derivation part 26B are joined by welding or the like while being connected to each other.

As described above, when viewed along the up-and-down direction, the first derivation part 26A and the second derivation part 26B are both located on the center line XC. Correspondingly, when viewed along the up-and-down direction, the first inlet 43A, the second inlet 43B, and the downstream inlet 43 are located on the center line XC. When viewed along the up-and-down direction, the central axes X21, X13, X22, and X14 of the first inlet 43A, the first derivation part 26A, the second inlet 43B, the second derivation part 26B agree with the center line XC.

The rotation center line X20 is an axis extending along the connection direction of the catalytic device 40 and the exhaust pipe 20. Specifically, the catalytic device 40 and the exhaust pipe 20 are connected as follows. That is, while the catalytic device 40 is in front of the exhaust pipe 20, these devices approach in the front-and-rear direction. The first derivation part 26A is inserted into the first inlet 43A, and the second derivation part 26B is inserted into the first inlet 43A. In this way, the catalytic device 40 and the exhaust pipe 20 are connected to each other. In this way, the connection direction of the catalytic device 40 and the exhaust pipe 20 is in the direction along the front-and-rear direction and in the direction along the rotation center line X20.

The exhaust gas generated in the first cylinder 2A is introduced to the first exhaust pipe 20A, and then introduced from the first derivation part 26A to the first inlet 43A. The exhaust gas generated in the second cylinder 2B is introduced to the second exhaust pipe 20B, and then introduced from the second derivation part 26B to the second inlet 43B. These exhaust gases are introduced to the upstream body 42A via the first inlet 43A and the second inlet 43B. These exhaust gases merge inside the upstream body 42A. In this way, in the present first embodiment, the upstream body 42A functions as a merging part where the exhaust gas introduced to the catalytic device 40 from the first derivation part 26A and the exhaust gas introduced to the catalytic device 40 from the second derivation part 26B merge. The upstream body 42A corresponds to "merging part" in the present disclosure.

The exhaust gas that flows into the upstream body 42A expands inside the upstream body 42A and the pressure of the exhaust gas decreases. This reduces the exhaust noise by passing through the upstream body 42A. In this way, the catalytic device 40 has a silencing structure that reduces the exhaust noise, and has a function of purifying the exhaust gas and a function of reducing the exhaust noise. Note that the exhaust gas that has passed through the upstream body 42A is introduced into the catalyst body 41. The exhaust gas is purified inside the catalyst body 41.

The exhaust system 4 includes an exhaust gas sensor 70 for detecting the properties of the exhaust gas. The exhaust gas sensor 70 is, for example, an O2 sensor that detects the oxygen concentration in the exhaust gas. The O2 sensor outputs a detection result indicating whether the fuel is burned at an ideal air-fuel ratio based on the properties of the exhaust gas. Note that the exhaust gas sensor 70 is not limited to a sensor that detects the oxygen concentration in the exhaust. For example, the exhaust gas sensor 70 may be a sensor that detects the exhaust temperature or the like. The exhaust gas sensor 70 is attached to the upstream body 42A. The exhaust gas sensor 70 is attached to the upstream body 42A, with the tip facing the inside of the upstream body 42A and in a posture protruding to the right from the right end surface of the upstream body 42A. In a similar manner to the catalytic device 40, the exhaust gas sensor 70 is placed at the position diagonally forward and downward of the front of the fan body 82, in front of the lower part of the engine body 2. The exhaust gas sensor 70 is placed between the left side surfaces of the first cylinder block 11A and the first cylinder head 12A, and the right side surfaces of the second cylinder block 11B and the second cylinder head 12B, near the center line XC.

A fixed part 48 is provided on the outer surface of the upstream body 42A. The fixed part 48 is a part where the coupling member 32 is fixed. A through hole is formed in the fixed part 48. The end of the coupling member 32 is fixed to the fixed part 48 by a bolt inserted into the through hole and a nut screwed onto the bolt. As shown in FIG. 4, in a state where the catalytic device 40 is in the first posture, one end of the coupling member 32 is fastened to the second support part 31B by a bolt. In this state, the other end of the coupling member 32 is fastened to the fixed part 48 by a bolt and nut. As a result, the catalytic device 40 is supported by the second cylinder head 12B and consequently by the engine body 2. Note that FIG. 4 shows the coupling member 32 by dashed lines when the catalytic device 40 is in a second posture, which will be described later. At this time, the coupling member 32 is fastened to the first support part 31A. Here, the coupling structure of the fixed part 48 and the coupling member 32 is not limited to the structure using a bolt and nut as described above. For example, the fixed part 48 and the coupling member 32 may be coupled by welding or the like.

The downstream outlet 44 protrudes to the left from the left side surface of the downstream body 42B. The downstream outlet 44 has a tubular shape that extends in the right-and-left direction. The downstream outlet 44 opens to the right and communicates with the inner space of the upstream body 42A at the right end. The downstream outlet 44 has a cylindrical shape with the central axis extending in the right-and-left direction.

The connection pipe 50 is a tubular member through which the exhaust gas flows. The connection pipe 50 connects the downstream outlet 44 to the muffler 60. The connection pipe 50 has a U shape. One end of the connection pipe 50 is connected to the downstream outlet 44. The connection pipe 50 extends to the left from the downstream outlet 44, turns back at the left end, and extends to the right. In the following, the end of the connection pipe 50 connected to the downstream outlet 44 is referred to as first end 51, whereas the end different from the first end 51 is referred to as second end 52 as appropriate.

Each of the first end 51 and the second end 52 has a cylindrical shape with the central axis extending in the right-and-left direction. The downstream outlet 44 and the first end 51 are connected to each other by inserting the first end 51 into the downstream outlet 44. The downstream outlet 44 and the first end 51 are placed coaxially. In the present first embodiment, the downstream outlet 44 and the first end 51 are joined by welding or the like while being connected to each other.

The muffler 60 has a tubular shape extending in the right-and-left direction. The muffler 60 is placed substantially parallel to the catalytic device 40 and faces the catalytic device 40 in the direction intersecting with the right-and-left direction. In the examples shown in FIGS. 1 to 5, the muffler 60 is placed below the catalytic device 40 and faces the catalytic device 40 in the up-and-down direction. Correspondingly, the connection pipe 50 is placed to have a U shape that opens to the right when viewed along the front-and-rear direction. The second end 52 is located below the first end 51. When viewed along the up-and-down direction, the center of the muffler 60 in the right-and-left direction is located almost on the center line XC.

The muffler 60 includes a muffler case 61, a first partition wall 62, a second partition wall 63, a first exhaust gas flow pipe 64, and a second exhaust gas flow pipe 65. The muffler 60 has a bilaterally symmetrical structure.

The muffler case 61 includes a case body 61A having a tubular shape extending in the right-and-left direction. The muffler case 61 has a board-shaped first bottom wall 61B and a board-shaped second bottom wall 61C. The first bottom wall 61B blocks the left end of the case body 61A. The second bottom wall 61C blocks the right end of the case body 61A. The case body 61A has a cylindrical shape extending in the right-and-left direction, with the central axis extending in the right-and-left direction. Each of the bottom walls 61B and 61C has a substantially circular plate shape.

The first partition wall 62 and the second partition wall 63 are placed inside the muffler case 61. The partition walls 62 and 63 each have a surface orthogonal to the right-and-left direction. The partition walls 62 and 63 partition the inner space of the muffler case 61 into a first space S1, a central space S3, and a second space S2 in the right-and-left direction. The first partition wall 62 of the muffler case 61 is placed to the left of the second partition wall 63. The first space S1 is a space between the first partition wall 62 and the first bottom wall 61B. The second space S2 is a space between the second partition wall 63 and the second bottom wall 61C. The central space S3 is a space between the first partition wall 62 and the second partition wall 63.

The first exhaust gas flow pipe 64 has a tubular shape extending in the right-and-left direction. The first exhaust gas flow pipe 64 has a cylindrical shape, with the central axis extending in the right-and-left direction. The first exhaust gas flow pipe 64 is fixed to the first bottom wall 61B and the first partition wall 62 in a state of passing through the walls. The first exhaust gas flow pipe 64 extends in the right-and-left direction through the first bottom wall 61B and the first partition wall 62 inside the first space S1. A left end 64B of the first exhaust gas flow pipe 64 opens to the left outside the muffler case 61. The right end of the first exhaust gas flow pipe 64 opens to the right inside the central space S3.

The first exhaust gas flow pipe 64 is placed substantially at the radial center of the muffler case 61. The first space S1 is partitioned into a space on the outer periphery of the first exhaust gas flow pipe 64 and a space inside the first exhaust gas flow pipe 64. A plurality of first communication holes 64A is formed in a portion of the first exhaust gas flow pipe 64 located in the first space S1. Each first communication hole 64A penetrates the first exhaust gas flow pipe 64 from the front to the back along the radial direction of the first exhaust gas flow pipe 64.

The second exhaust gas flow pipe 65 has the same structure as the first exhaust gas flow pipe 64 and is supported by the muffler case 61 bilaterally symmetrically with the first exhaust gas flow pipe 64. Specifically, the second exhaust gas flow pipe 65 has a cylindrical shape extending in the right-and-left direction, with the central axis extending in the right-and-left direction. The second exhaust gas flow pipe 65 is fixed to the second bottom wall 61C and the second partition wall 63 in a state of passing through the walls. The second exhaust gas flow pipe 65 extends in the right-and-left direction through the second bottom wall 61C and the second partition wall 63 inside the second space S2. A right end 65B of the second exhaust gas flow pipe 65 opens to the right outside the muffler case 61. The left end of the second exhaust gas flow pipe 65 opens to the left inside the central space S3.

In a similar manner to the first exhaust gas flow pipe 64, the second exhaust gas flow pipe 65 is placed at the radial center of the muffler case 61. The second space S2 is partitioned into a space on the outer periphery of the second exhaust gas flow pipe 65 and a space inside the second exhaust gas flow pipe 65. A plurality of second communication holes 65A is formed in a portion of the second exhaust gas flow pipe 65 located in the second space S2. Each second communication hole 65A penetrates the second exhaust gas flow pipe 65 from the front to the back along the radial direction of the second exhaust gas flow pipe 65.

The left end 64B of the first exhaust gas flow pipe 64 is connected to the second end 52 of the connection pipe 50. This allows the exhaust gas to be introduced into the muffler 60 from the first exhaust gas flow pipe 64. That is, the muffler 60 extends to the right from the second end 52 of the connection pipe 50. The left end 64B of the first exhaust gas flow pipe 64 constitutes a second downstream inlet that introduces the exhaust gas into the muffler 60. In the following, the left end 64B of the first exhaust gas flow pipe 64 is referred to as second downstream inlet 64B as appropriate.

The second downstream inlet 64B and the second end 52 are connected to each other by inserting the second downstream inlet 64B into the second end 52. The second downstream inlet 64B and the second end 52 are placed coaxially. In the present first embodiment, the second downstream inlet 64B and the second end 52 are joined by welding or the like while being connected to each other.

The exhaust gas introduced from the second downstream inlet 64B flows into the central space S3 through the first exhaust gas flow pipe 64. The exhaust gas introduced into the central space S3 passes through the second exhaust gas flow pipe 65 and is discharged from the right end 65B of the second exhaust gas flow pipe 65 to the outside of the muffler 60, that is, to the atmosphere.

The diameter of the central space S3 is larger than the diameter of the first exhaust gas flow pipe 64. This reduces the pressure of the exhaust gas when the exhaust gas flows from the first exhaust gas flow pipe 64 into the central space S3. The exhaust noise is attenuated while passing through the first exhaust gas flow pipe 64 and the second exhaust gas flow pipe 65 by the effects of the first communication holes 64A and the second communication holes 65A. Therefore, by passing through the muffler 60, the exhaust noise becomes smaller.

Effects and the Like

As described above, the cross section of the downstream inlet 43 including the first inlet 43A and the second inlet 43B has a point-symmetric shape around the rotation center line X20 extending along the connection direction of the downstream inlet 43 and the exhaust pipe 20.

Figure 11:
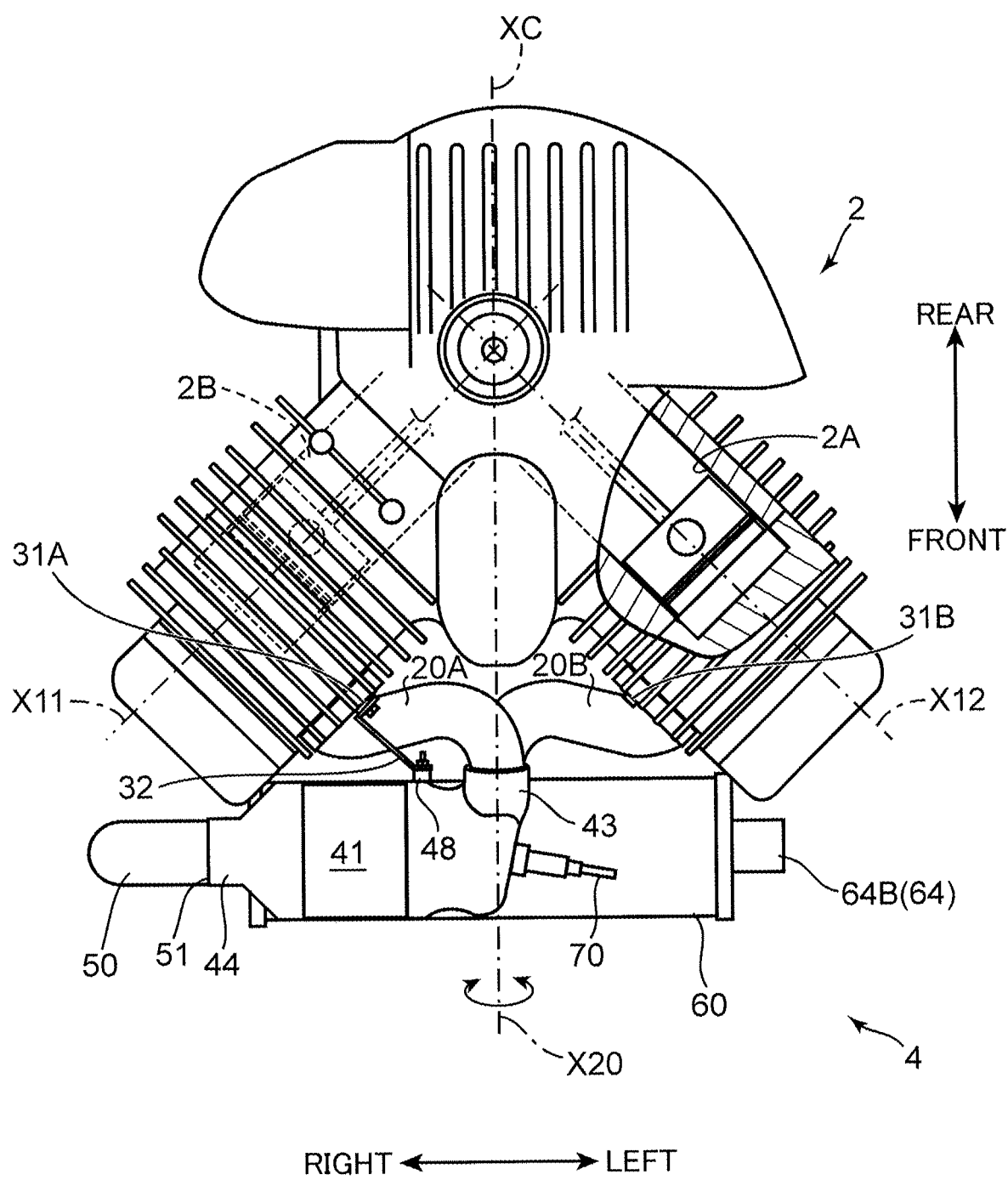
FIG. 11 is a schematic front view of the engine when the catalytic device is in a second posture.

Therefore, even in the second posture in which the catalytic device 40 rotates by 180 degrees around the rotation center line X20 from the first posture shown in FIGS. 1 to 5, the downstream inlet 43 can be connected to the first derivation part 26A and the second derivation part 26B, as shown in FIG. 11.

Specifically, as described above, when the catalytic device 40 rotates by 180 degrees around the rotation center line X20 from the first posture, the cross-sectional shape of the first inlet 43A after rotation agrees with the cross-sectional shape of the second inlet 43B before rotation. The cross-sectional shape of the second inlet 43B after the rotation agrees with the cross-sectional shape of the first inlet 43A before the rotation. Therefore, when the catalytic device 40 rotates by 180 degrees around the rotation center line X20 from the first posture, the first derivation part 26A can be inserted into the second inlet 43B, and the second derivation part 26B can be inserted into the second inlet 43B. Therefore, the catalytic device 40 can be connected to the exhaust pipes 20A and 20B.

As shown in FIG. 11, in the second posture, the catalytic device 40 extends to the right from the first derivation part 26A and the second derivation part 26B. In the engine 1 according to the present first embodiment, this allows the posture of the catalytic device 40 to be changed between the first posture extending to the left from the first derivation part 26A and the second derivation part 26B, that is, the first posture extending to one side of the port arrangement direction from the downstream end of the exhaust pipe 20, and the second posture extending to the right from the first derivation part 26A and the second derivation part 26B, that is, the second posture extending to the other side of the port arrangement direction, without changing the connection structure of the catalytic device 40 and the exhaust pipe 20. Therefore, the engine 1 according to the present first embodiment can improve the degree of flexibility of mounting the engine on the work machine or the like. The improvement in the degree of flexibility makes it possible to mount a common engine on different models of work machine. For example, the size and position of a device other than the engine 1 mounted on the lawn mower may be changed depending on the model of the lawn mower. In this case as well, changing the posture of the catalytic device 40 allows the common catalytic device 40 to be mounted on the lawn mower together with the device other than the engine 1. Therefore, there is no need to prepare a plurality of catalytic devices with different sizes, different connection structures with the exhaust pipe 20 and different sizes for each model.

In the second posture, the downstream outlet 44 is placed at the right end of the catalytic device 40. Therefore, in the engine 1 according to the present first embodiment, the downstream outlet 44 can be changed between the left and right ends of the catalytic device 40, without changing the connection structure of the catalytic device 40 and the exhaust pipe 20.

As shown in FIG. 11, in the engine 1 according to the present first embodiment, even when the catalytic device 40 is in the second posture, the catalytic device 40 can be connected to the muffler 60 via the connection pipe 50. Specifically, since the muffler 60 has a bilaterally symmetrical structure, even in the second posture, while connecting the downstream outlet 44 to the first end 51 of the connection pipe 50, the second end 52 of the connection pipe 50 can be connected to the right end 65B of the second exhaust gas flow pipe 65 of the muffler 60.

In this way, in the engine 1 according to the present first embodiment, the muffler 60 has a bilaterally symmetrical structure, and the second end 52 of the connection pipe 50 can connect to both the first exhaust gas flow pipe 64 located to the left of the muffler 60 and the second exhaust gas flow pipe 65 located to the right. Therefore, when the catalytic device 40 is in both the first posture and the second posture, the catalytic device 40 can be connected to the muffler 60 via the connection pipe 50 without changing the posture of the muffler 60.

As described above, when the catalytic device 40 is in the second posture, the second end 52 of the connection pipe 50 is connected to the right end 65B of the second exhaust gas flow pipe 65 of the muffler 60. Accordingly, in this case, the left end 64B of the first exhaust gas flow pipe 64 of the muffler 60 is open to the outside. Therefore, the left end 64B of the first exhaust gas flow pipe 64 functions as a part that discharges the exhaust gas to the atmosphere, and the exhaust gas is discharged to the left from the muffler 60. On the other hand, when the catalytic device 40 is in the first posture, the right end 65B of the second exhaust gas flow pipe 65 functions as a part that discharges the exhaust gas to the atmosphere, and the exhaust gas is discharged to the right from the muffler 60. Therefore, in the engine 1 according to the present first embodiment, by changing the posture of the catalytic device 40, the direction in which the exhaust gas of the engine is discharged to the atmosphere can be changed without changing the connection structure of the catalytic device 40 and the exhaust pipe 20. Therefore, the common engine can be mounted on different models of the lawn mower.

Specifically, lawn mowers come in models with different grass discharge directions. In the lawn mower, it is preferable for the discharge direction of the engine exhaust gas to be different from the grass discharge direction. Therefore, for models with grass discharge directions different from each other, it is necessary to make the discharge directions of the exhaust gas different from each other. In contrast, in the engine 1 according to the present first embodiment, the discharge direction of the exhaust gas can be changed by the posture change of the catalytic device 40, allowing the common engine 1 to be mounted on the models with grass discharge directions different from each other. Therefore, in the engine 1 according to the present first embodiment, there will be no need to change the mounting posture of the entire engine 1 on the lawn mower depending on the model. There will be no need to change the structures of the catalytic device 40 and the muffler 60 depending on the model. The above-described effects enable an increase in the number of lawn mower models on which the common engine 1 is mounted. In either case where the catalytic device 40 is in the first posture or in the second posture, the lengths of the exhaust pipe 20 and the catalyst 41B, and consequently the flow passage length of the exhaust gas between the cylinders 2A and 2B and the catalyst 41B are maintained the same. Therefore, it is possible to implement different models while maintaining the same purification performance of the exhaust gas.

In the engine 1 according to the present first embodiment, as shown in FIG. 11, when the catalytic device 40 is in the second posture, one end of the coupling member 32 is fastened to the first support part 31A by a bolt, and the other end is fastened to the fixed part 48 by a bolt and nut. This allows the catalytic device 40 to be supported by the first cylinder head 12A and consequently the engine body 2. In this way, in the engine 1 according to the present first embodiment, since the engine body 2 is provided with the first support part 31A and the second support part 31B, the catalytic device 40 is supported by the engine body 2 via the coupling member 32 in both cases where the catalytic device 40 is in the first posture and in the second posture. Therefore, regardless of the posture of the catalytic device 40, the catalytic device can be stably supported by the engine body 2.

In the engine 1 according to the present first embodiment, the first derivation part 26A and the second derivation part 26B are located on the center line XC as viewed along the up-and-down direction, and are located at the center of the engine body in the right-and-left direction. The size L2 of the catalytic device 40 in the right-and-left direction, that is, the size L2 in the longitudinal direction of the catalytic device 40 is set to half or less of the size L1 of the engine body 2 in the right-and-left direction. Therefore, as shown in FIGS. 1 and 11, in both the first posture and the second posture, the catalytic device 40 can be placed in front of the engine body 2 without protruding outward from the engine body 2 in the right-and-left direction. Therefore, the size of the entire engine 1 in the right-and-left direction can be reduced.

In the engine 1 according to the present first embodiment, the catalytic device 40 is in the posture extending in the right-and-left direction in both the first posture and the second posture. Therefore, it is possible to reduce the area occupied by the catalytic device 40 in the front-and-rear direction to be smaller than when the catalytic device 40 is in a posture extending in the front-and-rear direction.

In the engine 1 according to the present first embodiment, the catalyst 41B is built into the catalytic device 40. Therefore, the catalytic device 40 can purify the exhaust gas. Moreover, in the catalytic device 40, the upstream body 42A with a partitioned space inside is provided on the upstream side of the catalyst 41B. Therefore, after expanding the exhaust gas inside the upstream body 42A and lowering the temperature, the exhaust gas can be introduced into the catalyst 41B. Therefore, the deterioration of the catalyst 41B can be suppressed.

In the engine 1 according to the present first embodiment, the catalytic device 40 is placed in the path of the wind blown from the fan. Therefore, the deterioration of the catalyst 41B is further suppressed. The exhaust gas sensor 70 attached to the catalytic device 40 is also cooled by the wind blown from the fan 8. Therefore, the temperature rise of the exhaust gas sensor 70 is also suppressed. Specifically, the exhaust gas sensor 70 is located diagonally forward and downward of the front of the fan body 82, in front of the lower part of the engine body 2. The exhaust gas sensor 70 is placed between side surfaces of the first cylinder block 11A and the first cylinder head 12A, and the second cylinder block 11B and the second cylinder head 12B, near the center line XC. Therefore, it is possible to suppress the cylinder blocks 11A and 11B and the cylinder heads 12A and 12B from blocking the cooling wind from the fan 8 to the exhaust gas sensor 70, and the cooling wind can cool the exhaust gas sensor 70. In this way, preferably, the exhaust gas sensor 70 is placed on the opposite side of the fan 8 in the up-and-down direction with respect to the engine body 2, and is placed between the cylinder blocks 11A and 11B in the right-and-left direction.

In the engine 1 according to the present first embodiment, the muffler 60, which is a silencing device, is provided downstream of the catalytic device 40. Therefore, the exhaust noise can be reduced.

Moreover, the muffler 60 is connected to the catalytic device 40 in a posture extending in the right-and-left direction in a similar manner to the catalytic device 40. Therefore, it is possible to keep the area occupied by the catalytic device 40 and the muffler 60 in the front-and-rear direction smaller than when the muffler 60 is positioned in a posture extending in the front-and-rear direction. The catalytic device 40 and the muffler 60 are connected by the U-shaped connection pipe 50, and face each other in a direction crossing the right-and-left direction. Therefore, it is possible to keep the size of the device including the catalytic device 40 and the muffler 60 and the entire engine 1 in the right-and-left direction shorter than in the configuration of placing the catalytic device 40 and the muffler 60 side by side in the right-and-left direction. As shown in the examples in FIGS. 1 to 5, when the muffler 60 and the catalytic device 40 are placed facing each other in the up-and-down direction, it is possible to keep the size of the device including the catalytic device and the muffler and the entire engine 1 in the front-and-rear direction, shorter. Note that devices of the intake system, such as an air cleaner, may be placed above the catalytic device 40 and the muffler 60 such that a portion thereof overlaps when viewed along the up-and-down direction. By doing so, it is easier to achieve downsizing of the entire engine 1.

In the engine 1 according to the present first embodiment, the exhaust gas generated in the first cylinder 2A and the exhaust gas generated in the second cylinder 2B merge inside the upstream body 42A of the catalytic device 40. The exhaust gas sensor 70 is attached to the upstream body 42A. Therefore, the properties of the entire exhaust gas derived from the engine body 2 can be detected by the exhaust gas sensor 70.

As shown in FIG. 4, in a state where the catalytic device 40 is in the first posture, the exhaust gas sensor 70 protrudes to the right from the catalytic device 40. As shown in FIG. 11, in a state where the catalytic device 40 is in the second posture, the exhaust gas sensor 70 protrudes to the left from the catalytic device 40. In this way, in the engine 1 according to the present first embodiment, the exhaust gas sensor 70 protrudes from the catalytic device 40 to the right-and-left direction when the catalytic device 40 is in both the first posture and the second posture. Therefore, interference between the exhaust gas sensor 70 and other components located in the outer peripheral side of the catalytic device 40 can be avoided.

In the engine 1 according to the present first embodiment, the downstream outlet 44 of the catalytic device 40 and the first end 51 of the connection pipe 50 inserted and connected thereto both have a cylindrical shape and are placed coaxially. Therefore, the connection pipe 50 can be rotated around a central axis X50 of the downstream outlet 44 and the first end 51 while maintaining the connection state of the downstream outlet 44 and the first end 51. This allows the engine 1 according to the present first embodiment to reposition the muffler 60 freely around the central axis X50 extending in the right-and-left direction. For example, the muffler 60 can be repositioned from the position below the catalytic device 40 as shown by the solid lines in FIGS. 1 and 12 to the position in front of the catalytic device 40 as shown by the dashed line in FIG. 12.

Figure 12:
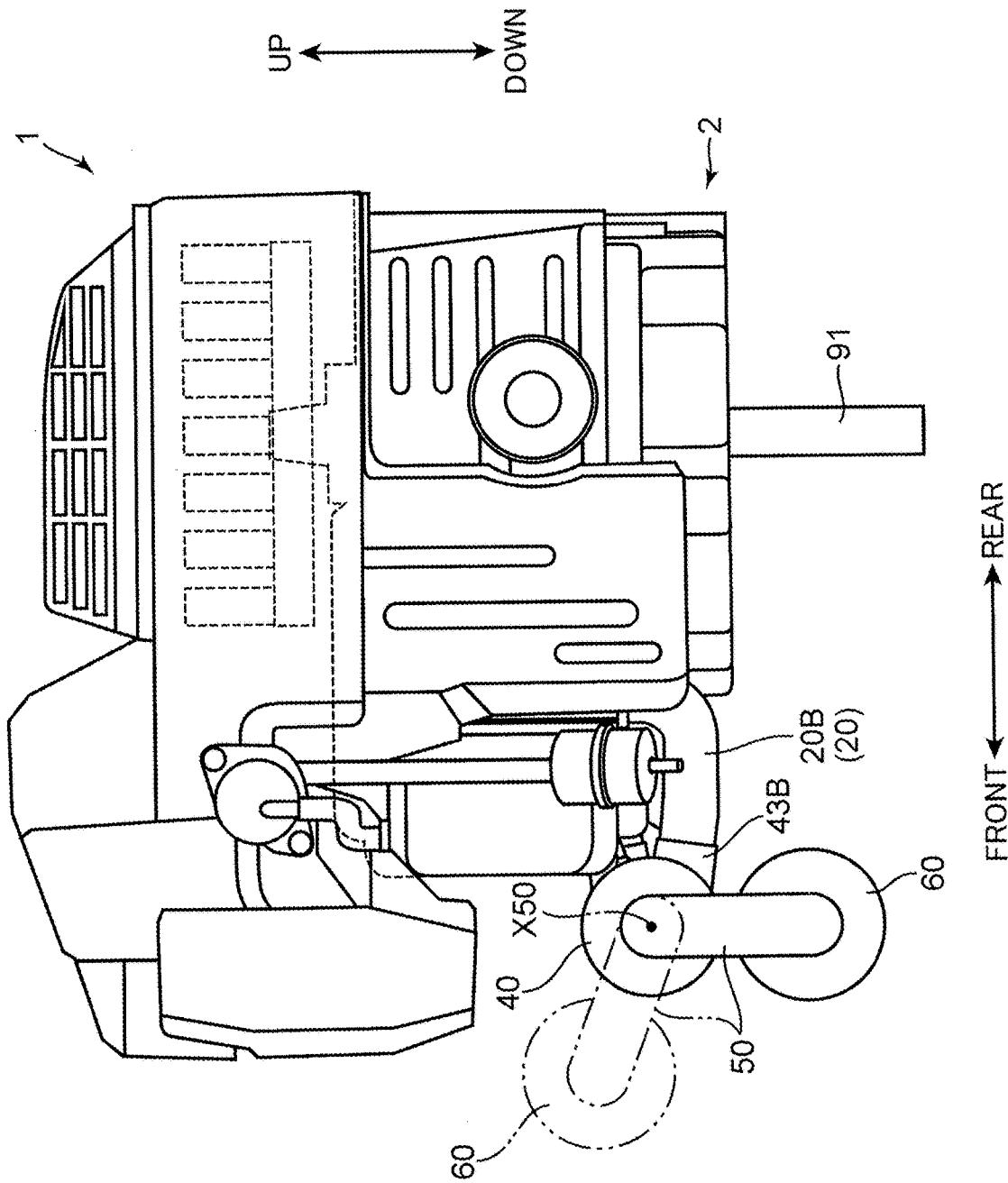
FIG. 12 is a schematic side view of the engine when a muffler of the exhaust system is in another posture.

For example, when mounting the engine 1 on a work machine having a small space in the up-and-down direction for installing the exhaust system 4, as shown by the dashed line in FIG. 12, by placing the muffler 60 at a position above the central axis X50, that is, a position closer to the engine body 2 in the up-and-down direction, the exhaust system 4 can be compactly installed around the engine body 2 in the up-and-down direction. Meanwhile, when mounting the engine 1 on a work machine having a small space in the front-and-rear direction for installing the exhaust system 4, as shown by the solid line in FIG. 12, by placing the muffler 60 at a position below the central axis X50, that is, a position closer to the engine body 2 in the front-and-rear direction, the exhaust system 4 can be compactly installed around the engine body 2 in the front-and-rear direction.

Variation

The downstream inlet 43 including the first inlet 43A and the second inlet 43B only needs to have a cross section that has point symmetry, and the specific shape is not limited to the shape described above. For example, the first inlet 43A and the second inlet 43B each may have a cylindrical shape that extends straight in the front-and-rear direction. The cross sections of the first inlet 43A and the second inlet 43B may be regular polygonal shapes or the like.

The connection structure of the first derivation part 26A and the first inlet 43A, and the connection structure of the second derivation part 26B and the second inlet 43B are not limited to the connection structure described above. For example, the first derivation part 26A and the first inlet 43A, and the second derivation part 26B and the second inlet 43B may be coupled by a bolt or the like.

The position of the downstream outlet 44 is not limited to the end of the downstream outlet 44 in the right-and-left direction, that is, the end of the longitudinal direction thereof. That is, the position of the downstream outlet 44 may be a position outside of the end of the catalytic device 40 in the longitudinal direction.

The size in the right-and-left direction, that is, the longitudinal size of the catalytic device 40 is not limited to the size described above. The longitudinal size of the catalytic device 40 may be larger than half of the size of the engine body 2 in the right-and-left direction, that is, in the port arrangement direction.

The posture of the catalytic device 40 does not have to be the posture that extends in the right-and-left direction, that is, in the port arrangement direction.

The positions of the first derivation part 26A and the second derivation part 26B, and the first inlet 43A and the second inlet 43B connected thereto are not limited to the positions described above. Specifically, these positions viewed from the up-and-down direction do not have to be on the center line XC. That is, these positions may be outside of the center line XC when viewed from the up-and-down direction.

The specific structure of the catalytic device 40 is not limited to the structure described above. For example, the embodiment has described the case where the catalytic device 40 has both the function of purifying the exhaust gas and the function of reducing or silencing the exhaust noise. However, either one of the functions may be omitted. Specifically, the catalyst 41B may be omitted from the catalytic device 40, and this device 40 may be used as the muffler.

The specific structure of the muffler 60 is not limited to the structure described above, and the specific structure for silencing the exhaust gas is not limited to the structure described above. The muffler 60 may be omitted. The muffler 60 may have a catalyst built-in to have the function of purifying the exhaust gas. Furthermore, instead of the muffler 60, a device having the function of purifying the exhaust gas may be used.

The position where the exhaust gas sensor 70 is attached is not limited to the upstream body 42A. The exhaust gas sensor 70 is not limited to a sensor that detects the oxygen concentration in the exhaust. For example, the exhaust gas sensor 70 may be a sensor that detects the exhaust temperature or the like. The exhaust gas sensor 70 may be omitted.

The engine body 2 is not limited to the V-twin engine, but may be an engine having more than two cylinders. The engine body 2 may be an inline multi-cylinder engine in which multiple cylinders are arranged in series.

The positions of an exhaust manifold 30 and a common outlet 35 are not limited to the positions described above. That is, the exhaust manifold 30 and the common outlet 35 may be provided outside the center line XC. The exhaust manifold 30 and the common outlet 35 may be provided at positions that are not between the first reference line X111 and the second reference line X112 when viewed along the up-and-down direction.

The exhaust manifold 30 may be provided at a position different from the path of the wind blown from the fan 8. The fan 8 may be omitted. An insulator may be provided between the catalytic device 40 and the engine body 2 to block heat emitted from the engine body 2.

Second Embodiment

In the first embodiment, the downstream inlet 43 has been provided at the end of the catalytic device 40 in the right-and-left direction, that is, at the longitudinal end, but the position of the downstream inlet 43 is not limited to this position. One example of an exhaust system 104 in which the downstream inlet is provided at a position other than the end of the catalytic device 40 in the right-and-left direction will be described as the second embodiment. Note that in the second embodiment, components similar to components of the first embodiment are denoted with the same reference sign and the description thereof will be omitted. In the second embodiment, the muffler 60 is omitted.

Figure 13:
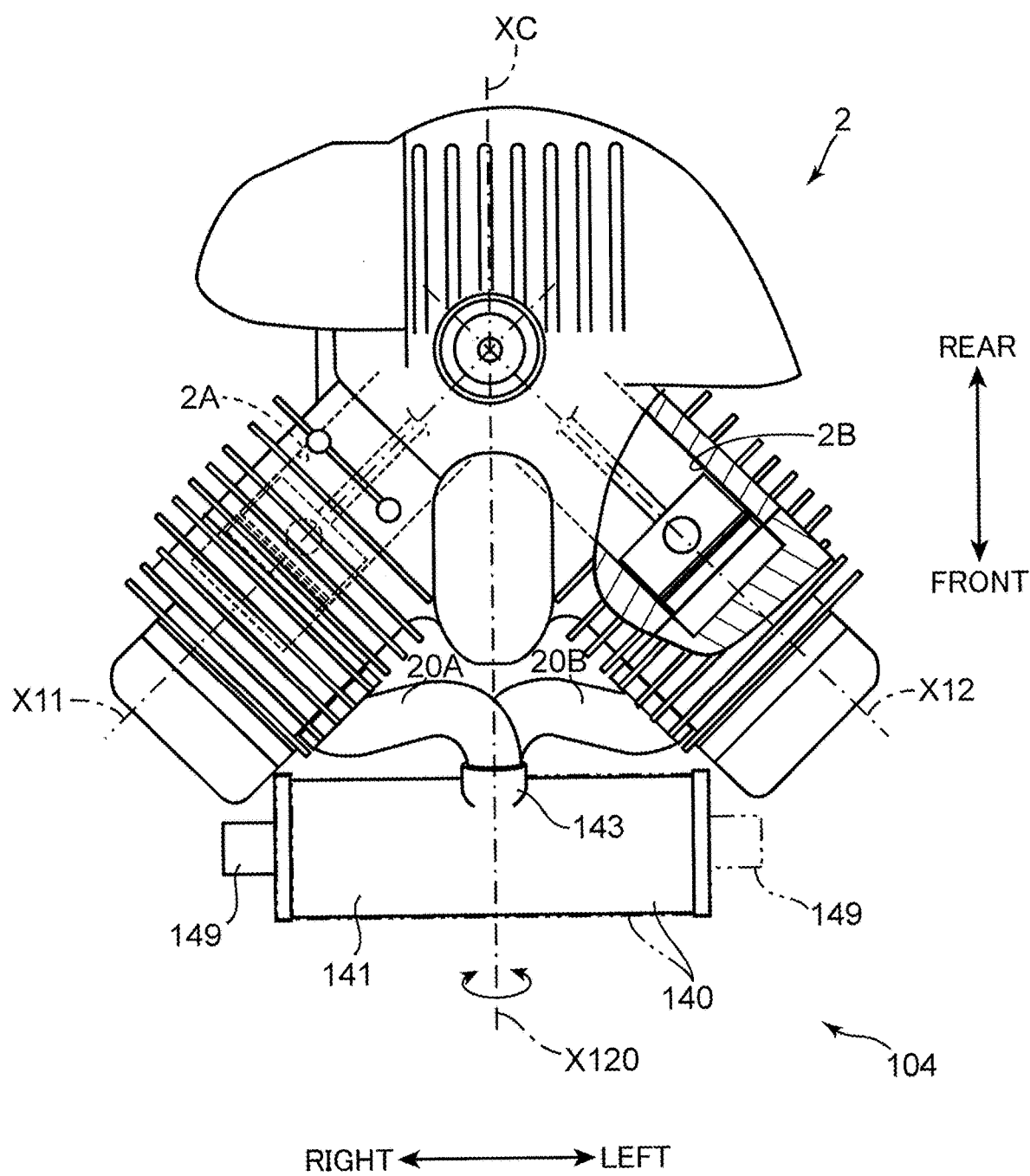
FIG. 13 is a schematic plan view of an engine according to a second embodiment of the present disclosure.

FIG. 13 is a schematic plan view of an engine body 2 and the exhaust system 104 according to the second embodiment. As shown in FIG. 13, in the second embodiment, a downstream inlet 143 is provided at a center of a catalytic device 140 in the longitudinal direction. In the second embodiment, as in the first embodiment, the downstream inlet 143 is connected to a first derivation part 26A and a second derivation part 26B in a posture extending in the right-and-left direction. As a result, the downstream inlet 143 is located at the center of the catalytic device 140 in the right-and-left direction. In the second embodiment, as in the first embodiment, a downstream outlet 149 is provided at an end of the catalytic device 140 in the longitudinal direction.

Figure 14:
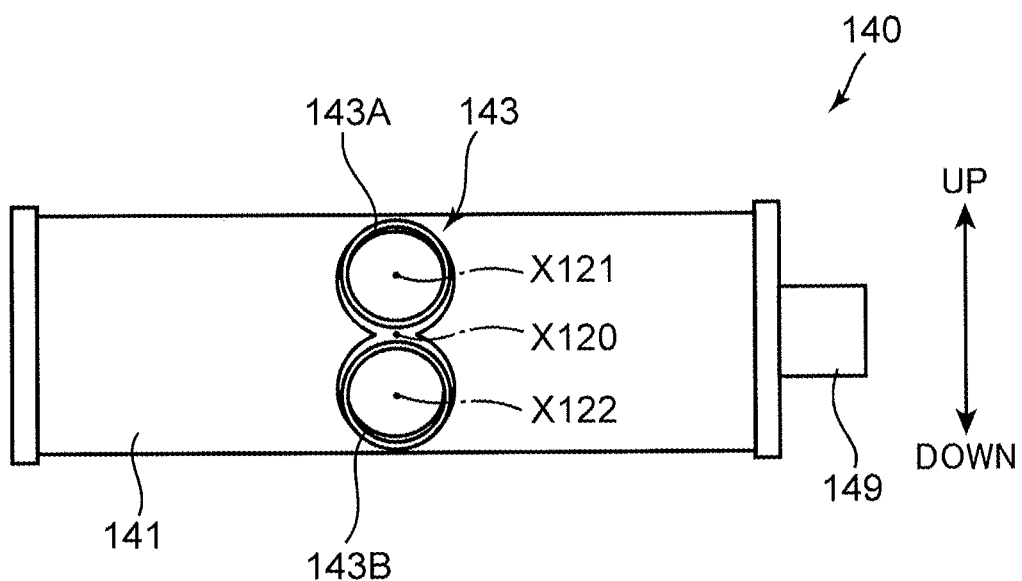
FIG. 14 is a view of a catalytic device according to the second embodiment of the present disclosure viewed from the rear.

FIG. 14 is a view of the catalytic device 140 according to the second embodiment viewed from the rear. As shown in FIG. 14, the downstream inlet 143 of the catalytic device 140 according to the second embodiment has a similar structure to the downstream inlet 43 according to the first embodiment, and the cross section orthogonal to the front-and-rear direction has a shape that is point-symmetric around an axis X120 extending in the front-and-rear direction. Specifically, in the second embodiment as well, the downstream inlet 143 includes a first inlet 143A and a second inlet 143B each having a cylindrical shape extending in the front-and-rear direction. In the second embodiment as well, a central axis X121 of the first inlet 143A and a central axis X122 of the second inlet 143B form the same straight line when viewed from above. The inner and outer diameters of the first inlet 143A and the second inlet 143B are the same as each other. The cross section of the downstream inlet 143 has a point-symmetric shape around the axis X120 that extends in the front-and-rear direction, bisecting the angle formed by the central axis X121 of the first inlet 143A and the central axis X122 of the second inlet 143B.

In the catalytic device 140 configured as described above according to the second embodiment, as in the first embodiment, the catalytic device 140 is connected to the first derivation part 26A and the second derivation part 26B in both a first posture shown by the solid line in FIG. 13 and a second posture shown by the dashed line and rotated 180 degrees around the axis X120 with respect to the first posture. In the first posture, the downstream outlet 149 is located on the right side, and in the second posture, the downstream outlet 149 is located on the left side. Thus, the position of the downstream outlet 149 can be changed.

Third Embodiment

The first embodiment has described the case where the number of inlets is the same as the number of exhaust pipes. However, the number of inlets is only required to be equal to or greater than the number of exhaust pipes, and may be greater than the number of exhaust pipes. One example of the engine according to the present disclosure, in which the number of inlets is greater than the number of exhaust pipes, will be described as a third embodiment. Note that the structure of the engine body is the same between the third embodiment and the first embodiment, and detailed descriptions thereof will be omitted. For other components, the description of the components similar to those in the first embodiment will be omitted. The components similar to those of the first embodiment are denoted with the same reference sign as appropriate.

Figure 15:
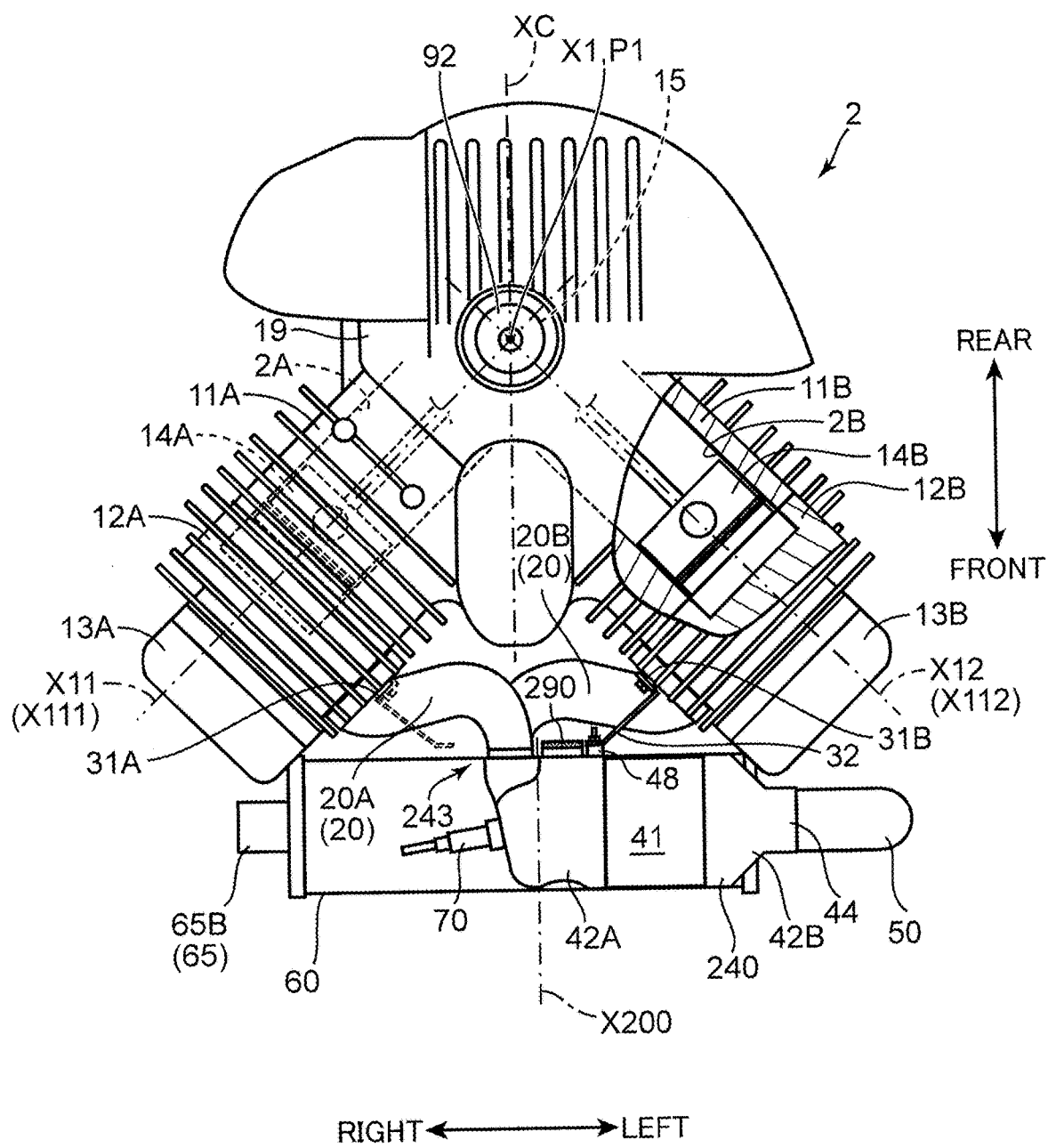
FIG. 15 is a schematic side view of an exhaust system according to a third embodiment of the present disclosure.

FIG. 15 is a schematic side view of an engine according to the third embodiment. FIG. 16 is a view of a catalytic device 240 according to the third embodiment viewed from the rear.

An engine body 2 of the third embodiment, as in the first embodiment, includes two cylinders 2A and 2B and two exhaust ports 17A and 17B. Correspondingly, the engine of the third embodiment includes two exhaust pipes 20A and 20B.

Meanwhile, unlike the first embodiment, in the third embodiment, four inlets are formed in a downstream inlet 243 of the catalytic device 240. The downstream inlet 24 has a fourfold symmetric shape around an axis X200 extending in the front-and-rear direction, that is, around a rotation center line X200.

Specifically, the downstream inlet 243 includes a first inlet 243A, a second inlet 243B, a third inlet 243C, and a fourth inlet 243D. The shapes of the inlets 243A to 243D are all the same. In more detail, each of the inlets 243A to 243D has a cylindrical shape extending in the front-and-rear direction, and each central axis extends in the front-and-rear direction. The inner diameters of the inlets 243A to 243D are the same, and so are the outer diameters. When viewed along the front-and-rear direction, the center points of the inlets 243A to 243D lie on the same circle centered at a predetermined point. When viewed along the front-and-rear direction, the center points of the inlets 243A to 243D are at equally spaced positions around the predetermined point, that is, at every 90 degrees. Thus, the shape of the downstream inlet 24 is fourfold symmetrical around the rotation center line X200 that passes through the predetermined point and extends in the front-and-rear direction. That is, when the catalytic device 240 is rotated 90 degrees, 180 degrees, and 270 degrees around the rotation center line X200, the shape of the downstream inlet 24 agrees at each of these angles before and after the rotation.

The positions of the inlets 243A to 243D as viewed in the direction shown in FIG. 16 will be described as follows. The first inlet 243A is provided above the right end of the catalytic device 40. The second inlet 243B is provided below the first inlet 243A. The third inlet 243C is provided to the left of the second inlet 243B. The fourth inlet 243D is provided above the third inlet 243C and to the left of the first inlet 243A.

The inlets 243A to 243D each have a shape that allows connection to a first derivation part 26A and a second derivation part 26B (FIG. 6). In the third embodiment, the first derivation part 26A and the second derivation part 26B each have a cylindrical shape in which each central axis extends parallel to the rotation center line X200. The outer diameters of the first derivation part 26A and the second derivation part 26B are set to be approximately the same as the inner diameters of the inlets 243A to 243D. This allows the first derivation part 26A and the second derivation part 26B to connect to the inlets 243A to 243D by being inserted thereto.

The engine configured as described above according to the third embodiment can change the posture of the catalytic device 240 to postures rotated an integral multiple of 90(=360÷4) degrees around the rotation center line X200 without changing the connection structure of the first derivation part 26A and the second derivation part 26B to the downstream inlet 243. That is, the posture of the catalytic device 240 can be changed to four different postures including the predetermined posture and postures rotated 90 degrees, 180 degrees, and 270 degrees from the predetermined posture.

Specifically, in the example shown in FIG. 15, the first derivation part 26A is connected to the first inlet 243A, and the second derivation part 26B is connected to the second inlet 243B. As a result, the catalytic device 240 has a posture extending to the left from the derivation parts 26A and 26B.

Meanwhile, when the catalytic device 240 is rotated 90 degrees around the rotation center line X200 from the posture shown in FIG. 15, the catalytic device 240 can be connected to the derivation parts 26A and 26B by connecting the first derivation part 26A to the fourth inlet 243D and connecting the second derivation part 26B to the first inlet 243A. In other words, when the first derivation part 26A is connected to the fourth inlet 243D and the second derivation part 26B is connected to the first inlet 243A, the posture of the catalytic device 240 can be changed from the posture shown in FIG. 15 to the posture rotated 90 degrees around the rotation center line X200 while achieving the connection of the catalytic device 240 to the derivation parts 26A and 26B. In this case, the catalytic device 240 has a posture extending upward from the derivation parts 26A and 26B. Note that even when the first derivation part 26A is connected to the third inlet 243C and the second derivation part 26B is connected to the second inlet 243B, the catalytic device 240 can have a posture extending upward from the derivation parts 26A and 26B while connecting to the derivation parts 26A and 26B.

When the first derivation part 26A is connected to the second inlet 243B and the second derivation part 26B is connected to the first inlet 243A, the posture of the catalytic device 240 can be changed from the posture shown in FIG. 15 to the posture rotated 180 degrees around the rotation center line X200 while achieving the connection of the catalytic device 240 to the derivation parts 26A and 26B. In this case, the catalytic device 240 has a posture extending to the right from the derivation parts 26A and 26B. Note that even when the first derivation part 26A is connected to the third inlet 243C and the second derivation part 26B is connected to the fourth inlet 243D, the catalytic device 240 can have a posture extending to the right from the derivation parts 26A and 26B while connecting to the derivation parts 26A and 26B.

When the first derivation part 26A is connected to the first inlet 243A and the second derivation part 26B is connected to the fourth inlet 243D, the posture of the catalytic device 240 can be changed from the posture shown in FIG. 15 to the posture rotated 180 degrees around the rotation center line X200 while achieving the connection of the catalytic device 240 to the derivation parts 26A and 26B. In this case, the catalytic device 240 has a posture extending downward from the derivation parts 26A and 26B. Note that even when the first derivation part 26A is connected to the second inlet 243B and the second derivation part 26B is connected to the third inlet 243C, the catalytic device 240 can have a posture extending downward from the derivation parts 26A and 26B while connecting to the derivation parts 26A and 26B. Here, inlets to which the derivation parts 26A and 26B are not connected may be blocked by a blocking component 290 that blocks the inlets. In the third embodiment, the blocking component 290 is joined to the inlet by welding or the like while blocking the inlet from the rear. The blocking component 290 is not limited to the example in FIG. 15, and may be a tubular member similar to the exhaust pipe, with the tip thereof blocked.

In this way, in the engine according to the third embodiment as well, as in the first embodiment, the posture of the catalytic device 240 can be changed without changing the connection structure to the exhaust pipes 20A and 20B. Therefore, in the engine according to the third embodiment as well, as in the first embodiment, the degree of flexibility of mounting the engine on the work machine or the like can be improved, making it possible for a common engine to be mounted on different models of work machine. In the third embodiment, since the downstream inlet 243 has a fourfold symmetric shape, the posture of the catalytic device 40 can be changed to postures rotated by an integral multiple of 90(=360÷4) degrees around the rotation center line X200.

Variation of Third Embodiment

Here, the number of exhaust pipes is not limited to two, but may be three or more. The number of inlets is only required to be equal to or greater than the number of exhaust pipes. For example, when the number of exhaust pipes is two as in the third embodiment, the number of inlets may be three, or five or more. The third embodiment has described the case where the shape of the downstream inlet 243 is fourfold symmetrical, but this number "4" can be set to the same number (integer) as the number of inlets. That is, the downstream inlet may be formed in an n-fold symmetric shape, where n is the number of inlets. By doing so, the shape of the downstream inlet 243 can agree before and after rotation by an integral multiple of m(=360÷n) degrees around the central axis. Therefore, the posture of the catalytic device can be changed to n different postures. For example, when there are three inlets, the downstream inlet can have a three-fold symmetric shape. In this case, the posture of the catalytic device can be changed to three different postures.

Conclusion

The embodiments and the variation described above are summarized as follows.

An engine according to one aspect of the present disclosure includes: an engine body; an exhaust pipe through which an exhaust gas discharged from the engine body flows; and a downstream device including a downstream inlet to which the exhaust pipe is connected, in which the engine body includes a first cylinder, a second cylinder, a first exhaust port that communicates with the first cylinder, and a second exhaust port that communicates with the second cylinder, the exhaust pipe includes a first exhaust pipe connected to an outlet of the first exhaust port, and a second exhaust pipe connected to an outlet of the second exhaust port, the downstream inlet includes a first inlet to which a downstream end of the first exhaust pipe is connected, and a second inlet to which a downstream end of the second exhaust pipe is connected, and a cross section of the downstream inlet has a point-symmetric shape around an axis extending along a connection direction of the downstream inlet and the exhaust pipe to allow the downstream device to connect to the exhaust pipe when the downstream device is in both a first posture and a second posture that is rotated 180 degrees from the first posture.

According to the present disclosure, by rotating the downstream device 180 degrees around the axis extending along the connection direction of the downstream inlet and the exhaust pipe, the posture of the downstream device can be changed while maintaining the state where the first exhaust pipe and the second exhaust pipe are connected to the inlets of the downstream inlet. That is, the posture of the downstream device with respect to the exhaust pipe can be changed without changing the connection structure of the downstream device and the exhaust pipe. Therefore, the degree of flexibility of mounting the engine is increased. Using a common exhaust pipe and a common downstream device, it is possible to implement an engine with different relative positions of the downstream device with respect to the exhaust pipe. Therefore, for example, even if it is necessary to change the relative position depending on the type of vehicle on which the engine is mounted, there is no need to prepare different types of exhaust pipe and downstream device, which has cost advantages.

Preferably, the downstream device has a tubular shape extending in a predetermined direction, and the first posture and the second posture are postures in which the downstream device extends along a port arrangement direction that is a direction in which the outlet of the first exhaust port and the outlet of the second exhaust port are arranged.

According to this aspect, the area occupied by the downstream device in the direction orthogonal to the port arrangement direction can be kept small.

Preferably, the downstream inlet is provided at one end of the downstream device in a longitudinal direction.

According to this aspect, without changing the connection structure of the downstream device and the exhaust pipe, the posture of the downstream device can be changed to the posture extending from the downstream end of the exhaust pipe to one side in the port arrangement direction, and to the posture extending to the other side.

Preferably, the downstream end of the first exhaust pipe and the downstream end of the second exhaust pipe are located between the outlet of the first exhaust port and the outlet of the second exhaust port in the port arrangement direction.

According to this aspect, the downstream device is connected to the downstream end of the exhaust pipe in the posture extending in the port arrangement direction from the position between the outlet of the first port and the outlet of the second port. Therefore, both when the downstream device is in the first posture and in the second posture, at least a portion of the downstream device can be placed in an area between the outlet of the first port and the outlet of the second port in the port arrangement direction, and the amount in which the downstream device protrudes from this area can be kept small.

Preferably, the downstream end of the first exhaust pipe and the downstream end of the second exhaust pipe are located at a center of the engine body in the port arrangement direction.

According to this aspect, the downstream device is connected to the downstream ends of the exhaust pipes in a posture extending from the center of the engine body in the port arrangement direction. Therefore, both when the downstream device is in the first posture and in the second posture, the amount in which the downstream device protrudes from the engine body in the port arrangement direction can be kept small.

Preferably, a longitudinal size of the downstream device is equal to or less than half of a size of the engine body in the port arrangement direction.

According to this aspect, both when the downstream device is in the first posture and in the second posture, it is possible to avoid the downstream device protruding from the engine body in the port arrangement direction.

Preferably, the downstream device includes a downstream outlet that is provided at one end of the longitudinal direction of the downstream device and derives the exhaust gas.

According to this aspect, without changing the connection structure of the downstream device and the exhaust pipe, the position of the downstream outlet can be changed to one side and the other side of the downstream device in the port arrangement direction.

Preferably, the engine includes: a second downstream device that has a tubular shape extending in a predetermined direction and includes a second downstream inlet through which the exhaust gas is introduced at one end of the longitudinal direction of the second downstream device; and a connection pipe that has a U shape protruding to one side of the port arrangement direction and connects the downstream outlet to the second downstream inlet, in which the downstream device extends from one end of the connection pipe to another side of the port arrangement direction, and the second downstream device extends from other end of the connection pipe to the other side of the port arrangement direction.

According to this aspect, while connecting the second downstream device to the downstream device, the area occupied by these devices in the direction orthogonal to the port arrangement direction can be kept small. As described above, in the engine according to the present disclosure, the position of the downstream outlet can be changed to one side and the other side of the downstream device in the port arrangement direction. Therefore, no matter which side of the port arrangement direction the second downstream inlet of the second downstream device is located, the second downstream device can be connected to the downstream device.

Apart from the above configuration, the downstream inlet may be provided at a center of the downstream device in a longitudinal direction of the downstream device.

According to this aspect, the posture of the downstream device can be changed without changing the connection structure of the downstream device and the exhaust pipe. According to this aspect, in both the first posture and the second posture, the downstream device can be placed compactly around the downstream end of the exhaust pipe in the port arrangement direction.

In the above-described configuration, preferably, the downstream device includes a downstream outlet that is provided at one end of the downstream device in the longitudinal direction of the downstream device and derives the exhaust gas.

According to this aspect, without changing the connection structure of the downstream device and the exhaust pipe, the position of the downstream outlet can be changed to one side and the other side of the downstream device in the port arrangement direction.

Preferably, the engine body includes a first piston that reciprocates inside the first cylinder, a second piston that reciprocates inside the second cylinder, and a crankshaft that is driven to rotate by the first piston and the second piston, the first cylinder and the second cylinder are displaced with a first cylinder axis that is a central axis of the first cylinder intersecting a second cylinder axis that is a central axis of the second cylinder as viewed along a crank axis that is a central axis of the crankshaft, and the downstream end of the first exhaust pipe and the downstream end of the second exhaust pipe are displaced at positions with an equal distance from the first cylinder axis and the second cylinder axis as viewed along the crank axis.

According to this aspect, the downstream device is connected to the downstream end of the exhaust pipe in a posture extending in the port arrangement direction from a position equidistant from the first cylinder axis and the second cylinder axis. Therefore, both when the downstream device is in the first posture and in the second posture, the amount in which the downstream device protrudes outside from the area between the first cylinder axis and the second cylinder axis in the port arrangement direction can be kept small.

The crank axis may be a line extending in the up-and-down direction.

Preferably, the engine includes a coupling member that couples the downstream device with the engine body, in which the engine body includes: a first support part that supports the coupling member coupled with the downstream device in a state where the downstream device is in the first posture; and a second support part that is provided at a position different from the first support part and supports the coupling member coupled with the downstream device in a state where the downstream device is in the second posture.

According to this aspect, regardless of whether the posture of the downstream device is the first posture or the second posture, the engine body can support the downstream device.

Preferably, the downstream device includes a catalyst that purifies the exhaust gas.

According to this aspect, the exhaust gas can be purified by using the downstream device.

Preferably, the engine includes a fan that blows a wind to the engine body, and the downstream device is placed in a path of the wind blown from the fan.

According to this aspect, it is possible to prevent the temperature of the catalyst built into the downstream device from becoming excessively high, thereby suppressing catalyst deterioration.

Preferably, the downstream device has a silencing structure that reduces exhaust noise.

According to this aspect, the exhaust noise can be reduced by using the downstream device.

Preferably, the downstream device includes a merging part where the exhaust gas introduced from the downstream end of the first exhaust pipe and the exhaust gas introduced from the downstream end of the second exhaust pipe merge.

According to this aspect, the exhaust gas derived from each cylinder can be merged inside the downstream device.

Preferably, an exhaust gas sensor that detects properties of the exhaust gas passing through the merging part is attached to the merging part.

According to this aspect, the properties of the entire exhaust gas discharged from the engine body can be detected by the exhaust gas sensor.

An exhaust structure according to one aspect of the present disclosure includes: an exhaust pipe including: a first exhaust pipe connected to an outlet of a first exhaust port of an engine body; and a second exhaust pipe connected to an outlet of a second exhaust port of the engine body; and a downstream device including a downstream inlet connected to the exhaust pipe, in which the downstream inlet includes a first inlet to which a downstream end of the first exhaust pipe is connected, and a second inlet to which a downstream end of the second exhaust pipe is connected, and a cross section of the downstream inlet has a point-symmetric shape around an axis extending along a connection direction of the downstream inlet and the exhaust pipe to allow the downstream device to connect to the exhaust pipe when the downstream device is in both a first posture and a second posture that is rotated 180 degrees from the first posture.

According to the present disclosure, by rotating the downstream device 180 degrees around the axis extending along the connection direction of the downstream inlet and the exhaust pipe, the posture of the downstream device can be changed while maintaining the state where the first exhaust pipe and the second exhaust pipe are connected to the inlets of the downstream inlet independently. That is, the relative position of the downstream device with respect to the exhaust pipe can be changed without changing the connection structure of the downstream device and the exhaust pipe. Therefore, when the exhaust structure according to the present disclosure is applied to the engine, the degree of flexibility of mounting the engine can be increased. Using a common exhaust pipe and a common downstream device, it is possible to implement an engine with different relative positions of the downstream device with respect to the exhaust pipe. Therefore, for example, even if it is necessary to change the relative position depending on the type of vehicle on which the engine is mounted, there is no need to prepare different types of exhaust pipe and downstream device, which has cost advantages.

An engine according to another aspect of the present disclosure includes: an engine body in which a plurality of cylinders is formed; a plurality of exhaust pipes that is connected to the engine body and into which an exhaust gas discharged from each of the cylinders is introduced; and a downstream device including a downstream inlet to which each of the exhaust pipes is connected, in which the downstream inlet includes an equal or greater number of inlets than a number of the exhaust pipes, the inlets each being connectable to a downstream end of each of the exhaust pipes, and the downstream inlet, with the number of inlets being n, has an n-fold symmetric shape around an axis extending along a connection direction of the downstream inlet and the exhaust pipes.

According to the present disclosure, by rotating the downstream device by an integral multiple of $m(=360\div n)$ degrees around the axis extending along the connection direction of the downstream inlet and the exhaust pipe, the posture of the downstream device can be changed while maintaining the state where the exhaust pipes are connected to the inlets of the downstream inlet. Therefore, the degree of flexibility of mounting the engine is increased. Using a common exhaust pipe and a common downstream device, it is possible to implement an engine with different relative positions of the downstream device with respect to the exhaust pipe. Therefore, for example, even if it is necessary to change the relative position depending on the type of vehicle on which the engine is mounted, there is no need to prepare different types of exhaust pipe and downstream device, which has cost advantages.

The invention claimed is:
1. An engine comprising:
an engine body;
an exhaust pipe through which an exhaust gas discharged from the engine body flows; and a downstream device including a downstream inlet to which the exhaust pipe is connected,
wherein the engine body includes a first cylinder, a second cylinder, a first exhaust port that communicates with the first cylinder, and a second exhaust port that communicates with the second cylinder,
the exhaust pipe includes a first exhaust pipe connected to an outlet of the first exhaust port, and a second exhaust pipe connected to an outlet of the second exhaust port,
the downstream inlet includes a first inlet to which a downstream end of the first exhaust pipe is connected, and a second inlet to which a downstream end of the second exhaust pipe is connected, and
a cross section of the downstream inlet has a point-symmetric shape around an axis extending along a connection direction of the downstream inlet and the exhaust pipe to allow the downstream device to connect to the exhaust pipe when the downstream device is in both a first posture and a second posture that is rotated 180 degrees from the first posture.

2. The engine according to claim 1, wherein
the downstream device has a tubular shape extending in a predetermined direction, and
the first posture and the second posture are postures in which the downstream device extends along a port arrangement direction that is a direction in which the outlet of the first exhaust port and the outlet of the second exhaust port are arranged.

3. The engine according to claim 2, wherein the downstream inlet is provided at one end of the downstream device in a longitudinal direction.

4. The engine according to claim 3, wherein the downstream end of the first exhaust pipe and the downstream end of the second exhaust pipe are located between the outlet of the first exhaust port and the outlet of the second exhaust port in the port arrangement direction.

5. The engine according to claim 3, wherein the downstream end of the first exhaust pipe and the downstream end of the second exhaust pipe are located at a center of the engine body in the port arrangement direction.

6. The engine according to claim 5, wherein a longitudinal size of the downstream device is equal to or less than half of a size of the engine body in the port arrangement direction.

7. The engine according to claim 3, wherein the downstream device includes a downstream outlet that is provided at one end of the longitudinal direction of the downstream device and derives the exhaust gas.

8. The engine according to claim 7, further comprising:
a second downstream device that has a tubular shape extending in a predetermined direction and includes a second downstream inlet through which the exhaust gas is introduced at one end of the longitudinal direction of the second downstream device; and
a connection pipe that has a U shape protruding to one side of the port arrangement direction and connects the downstream outlet to the second downstream inlet,
wherein the downstream device extends from one end of the connection pipe to another side of the port arrangement direction, and
the second downstream device extends from other end of the connection pipe to the other side of the port arrangement direction.

9. The engine according to claim 2, wherein the downstream inlet is provided at a center of the downstream device in a longitudinal direction of the downstream device.

10. The engine according to claim 9, wherein the downstream device includes a downstream outlet that is provided at one end of the downstream device in the longitudinal direction of the downstream device and derives the exhaust gas.

11. The engine according to claim 2, wherein
the engine body includes a first piston that reciprocates inside the first cylinder, a second piston that reciprocates inside the second cylinder, and a crankshaft that is driven to rotate by the first piston and the second piston,
the first cylinder and the second cylinder are displaced with a first cylinder axis that is a central axis of the first cylinder intersecting a second cylinder axis that is a central axis of the second cylinder as viewed along a crank axis that is a central axis of the crankshaft, and
the downstream end of the first exhaust pipe and the downstream end of the second exhaust pipe are displaced at positions with an equal distance from the first cylinder axis and the second cylinder axis as viewed along the crank axis.

12. The engine according to claim 11, wherein the crank axis extends in an up-and-down direction.

13. The engine according to claim 1, further comprising a coupling member that couples the downstream device with the engine body,
wherein the engine body includes: a first support part that supports the coupling member coupled with the downstream device in a state where the downstream device is in the first posture; and a second support part that is provided at a position different from the first support part and supports the coupling member coupled with the downstream device in a state where the downstream device is in the second posture.

14. The engine according to claim 1, wherein the downstream device includes a catalyst that purifies the exhaust gas.

15. The engine according to claim 14, further comprising a fan that blows a wind to the engine body,
wherein the downstream device is placed in a path of the wind blown from the fan.

16. The engine according to claim 1, wherein the downstream device has a silencing structure that reduces exhaust noise.

17. The engine according to claim 1, wherein the downstream device includes a merging part where the exhaust gas introduced from the downstream end of the first exhaust pipe and the exhaust gas introduced from the downstream end of the second exhaust pipe merge.

18. The engine according to claim 17, wherein an exhaust gas sensor that detects properties of the exhaust gas passing through the merging part is attached to the merging part.

19. An exhaust structure comprising:
an exhaust pipe including: a first exhaust pipe connected to an outlet of a first exhaust port of an engine body; and a second exhaust pipe connected to an outlet of a second exhaust port of the engine body; and
a downstream device including a downstream inlet connected to the exhaust pipe,
wherein the downstream inlet includes a first inlet to which a downstream end of the first exhaust pipe is connected, and a second inlet to which a downstream end of the second exhaust pipe is connected, and
a cross section of the downstream inlet has a point-symmetric shape around an axis extending along a connection direction of the downstream inlet and the exhaust pipe to allow the downstream device to connect to the exhaust pipe when the downstream device is in both a first posture and a second posture that is rotated 180 degrees from the first posture.

20. An engine comprising:

an engine body in which a plurality of cylinders is formed;

a plurality of exhaust pipes that is connected to the engine body and into which an exhaust gas discharged from each of the cylinders is introduced; and a downstream device including a downstream inlet to which each of the exhaust pipes is connected, wherein the downstream inlet includes an equal or greater number of inlets than a number of the exhaust pipes, the inlets each being connectable to a downstream end of each of the exhaust pipes, and the downstream inlet, with the number of inlets being n, has an n-fold symmetric shape around an axis extending along a connection direction of the downstream inlet and the exhaust pipes to allow the downstream device to connect to each of the exhaust pipes when the downstream device is in both a first posture and a second posture that is rotated by an integral multiple of $m(=360 \div n)$ degrees from the first posture.

* * * * *